United States Patent
Baldwin et al.

(10) Patent No.: US 10,769,260 B2
(45) Date of Patent: *Sep. 8, 2020

(54) BEHAVIORAL BIOMETRIC FEATURE EXTRACTION AND VERIFICATION

(71) Applicant: Assured Information Security, Inc., Rome, NY (US)

(72) Inventors: Jacob Baldwin, Cleveland, NY (US); Ryan Burnham, Fairport, NY (US); Robert Dora, Sherrill, NY (US); Andrew Meyer, Brockport, NY (US); Robert Wright, Sherrill, NY (US)

(73) Assignee: ASSURED INFORMATION SECURITY, INC., Rome, NY (US)

( * ) Notice: Subject to any disclaimer, the term of this patent is extended or adjusted under 35 U.S.C. 154(b) by 282 days.

This patent is subject to a terminal disclaimer.

(21) Appl. No.: 15/949,738

(22) Filed: Apr. 10, 2018

(65) Prior Publication Data
US 2019/0311099 A1    Oct. 10, 2019

(51) Int. Cl.
*G06F 21/32* (2013.01)
*G06N 3/08* (2006.01)
*G06N 3/04* (2006.01)

(52) U.S. Cl.
CPC .......... *G06F 21/32* (2013.01); *G06N 3/0472* (2013.01); *G06N 3/08* (2013.01); *G06F 2221/2151* (2013.01)

(58) Field of Classification Search
CPC .......... G06F 21/32; G06F 2221/2151; G06N 3/0472; G06N 3/08; G06N 7/005; G06N 3/0454
See application file for complete search history.

(56) References Cited

U.S. PATENT DOCUMENTS

| 7,934,639 B1* | 5/2011 | Chen ............... G06Q 20/20 235/375 |
| 9,401,148 B2 | 7/2016 | Lei et al. |

(Continued)

OTHER PUBLICATIONS

International Search Report and Written Opinion for PCT/US2019/026753 dated Jun. 6, 2019, pp. 1-14.

(Continued)

*Primary Examiner* — Aravind K Moorthy
(74) *Attorney, Agent, or Firm* — Matthew Hulihan; Heslin Rothenberg Farley & Mesiti PC

(57) ABSTRACT

A method for gait-based behavioral verification of user identity of a subject user of a computer system includes obtaining an enrollment signature corresponding to an identified user and serving as a unique identifier of the identified user, the enrollment signature including an enrollment determinate vector generated based on supplying enrollment gait data to a deep neural network for processing. The method further includes obtaining verification determinate vector(s), the verification determinate vector(s) for comparison to the enrollment signature to determine whether the subject user is the identified user. The method compares the verification determinate vector(s) to the enrollment signature and generates a probability indicator indicating a probability that gait data from a common user produced, from the deep neural network, the enrollment signature and the verification determinate vector(s), and indicates to the computer system whether, based on the probability indicator, the subject user is verified to be the identified user.

20 Claims, 9 Drawing Sheets

(56) References Cited

U.S. PATENT DOCUMENTS

| | | | |
|---|---|---|---|
| 9,633,268 B1* | 4/2017 | Ma | G06K 9/00342 |
| 10,098,201 B1 | 10/2018 | Wilson et al. | |
| 10,170,135 B1* | 1/2019 | Pearce | G06N 20/20 |
| 10,546,183 B2* | 1/2020 | Rodriguez | G06K 9/00906 |
| 2002/0150241 A1 | 10/2002 | Scheidt et al. | |
| 2005/0171851 A1 | 8/2005 | Applebaum et al. | |
| 2006/0056662 A1* | 3/2006 | Thieme | G06K 9/685 |
| | | | 382/115 |
| 2006/0280339 A1 | 12/2006 | Cho | |
| 2012/0032781 A1 | 2/2012 | Moon et al. | |
| 2013/0340061 A1 | 12/2013 | Tsukamoto et al. | |
| 2014/0181529 A1 | 7/2014 | Joyce, III | |
| 2016/0232726 A1 | 8/2016 | Zizi et al. | |
| 2016/0350761 A1* | 12/2016 | Raziel | G06Q 20/40145 |
| 2017/0243058 A1* | 8/2017 | Tan | G06K 9/00348 |
| 2017/0264599 A1 | 9/2017 | O'Regan | |
| 2018/0082304 A1 | 3/2018 | Summerlin et al. | |
| 2018/0293393 A1 | 10/2018 | Effendi et al. | |
| 2019/0150793 A1* | 5/2019 | Barth | G06N 20/10 |
| 2019/0172232 A1* | 6/2019 | Penatti | G06N 3/0454 |
| 2019/0190920 A1 | 6/2019 | Connell, II et al. | |
| 2019/0268331 A1* | 8/2019 | Toth | H04L 63/0861 |
| 2019/0280869 A1* | 9/2019 | Streit | G06N 3/0454 |
| 2019/0311098 A1* | 10/2019 | Baldwin | G06N 3/04 |
| 2019/0311099 A1* | 10/2019 | Baldwin | G06N 7/005 |
| 2019/0311260 A1* | 10/2019 | Baldwin | G06N 3/0454 |
| 2019/0311261 A1* | 10/2019 | Baldwin | G06N 3/049 |

OTHER PUBLICATIONS

International Search Report and Written Opinion for PCT/US2019/026754 dated Jun. 6, 2019, pp. 1-14.
Ceker Hayreddin, et al.: "Sensitivity analysis in keystroke dynamics using convolutional neural networks", 2017 IEEE Workshop on Information Forensics and Security (WIFS), IEEE, Dec. 4, 2017 (Dec. 4, 2017), 6 pgs.
Anders Oland, et al.: "Be Careful What You Backpropagate: A Case for Linear Output Activations & Gradient Boosting", arxiv.org, Cornell University Library, 201 OLIN Library Cornell University Ithaca, NY 14853, Jul. 13, 2017 (Jul. 13, 2017), 10 pgs.
Anonymous: "What should be my activation function for last layer of neural network?—ResearchGate", Nov. 2, 2015 (Nov. 2, 2015), 4 pgs.
Saket Maheshwary, et al.: "Deep Secure: A Fast and Simple Neural Network based approach for User Authentication and Identification via Keystroke Dynamics", Jan. 1, 2017 (Jan. 1, 2017), 8 pgs.
Omid Dehzangi, et al.: "IMU-Based Gait Recognition Using Convolutional Neural Networks and Multi-Sensor Fusion", Sensors, vol. 17, No. 12, (Nov. 27, 2017), 22 pgs.
Giorgi Giacomo, et al.: "Try Walking in My Shoes, if You Can: Accurate Gait Recognition Through Deep Learning", Sep. 27, 2017 (Sep. 27, 2017), 12 pgs.
Ahmed, A., et al., "Biometric recognition based on free-text keystroke dynamics." IEEE Transactions on Cybernetics, 44(4):458-472, Apr. 2014.
Anguita, D. et al., "A public domain dataset for human activity recognition using smartphones." In Artificial Neural Networks, Computational Intelligence and Machine Learning (ESANN), 2013 European Symposium on, pp. 437-442, 2013.
Banerjee, S., et al., "Biometric authentication and identification using keystroke dynamics: a survey." Journal of Pattern Recognition Research, pp. 116-139, 2012.
Blasco, J., et al., "A survey of wearable biometric recognition systems." ACM Computing Surveys (CSUR), 49(3):43, 2016, 34 pgs.
Dora, R., et al., "Remote suspect identification and the impact of demographic features on keystroke dynamics." In SPIE Defense, Security, and Sensing: Cyber Sensing, 2013, 15 pgs.
Graves, A., et al., "Speech recognition with deep recurrent neural networks." In 2013 IEEE International Conference on Acoustics, Speech and Signal Processing (ICASSP), pp. 6645-6649. IEEE, 2013.
Gunetti, D., et al., "Keystroke analysis of free text." ACM Transactions on Information and System Security, 8(3):312-347, Aug. 2005.
Heigold, G., et al., "End-to-end text-dependent speaker verification." In Acoustics, Speech and Signal Processing (ICASSP), 2016 IEEE International Conference on, pp. 5115-5119. IEEE, 2016.
Jain, A., et al., "Biometric recognition: an overview." In Second generation biometrics: The ethical, legal and social context, pp. 49-79. Springer, 2012.
Killourhy, K., et al., "Comparing anomaly-detection algorithms for keystroke dynamics." In 2009 IEEE/IFIP International Conference on Dependable Systems & Networks, pp. 125-134. IEEE/IFIP, 2009.
Krizhevsky, A., et al., "Imagenet classification with deep convolutional neural networks." In Advances in neural information processing systems, pp. 1097-1105, 2012.
Kumar, R., et al., "Continuous authentication of smartphone users by fusing typing, swiping, and phone movement patterns." In Biometrics Theory, Applications and Systems (BTAS), 2016 IEEE 8th International Conference on, pp. 1-8. IEEE, 2016.
LeCun, Y., et al., "Deep learning." Nature, 521 (7553):436-444, 2015.
Lu, H., et al., "Unobtrusive gait verification for mobile phones." In Proceedings of the 2014 ACM international symposium on wearable computers, pp. 91-98. ACM, 2014.
Murphy, C., et al., "Shared dataset on natural humancomputer interaction to support continuous authentication research." In International Joint Conference on Biometrics (ICBJ), 2017, 6 pgs.
Silver, D., et al., "Alphago: Mastering the ancient game of go with machine learning." Research Blog, 2016, 6 pgs.
Taigman, Y., et al., "Deepface: Closing the gap to human-level performance in face verification." In Proceedings of the IEEE conference on computer vision and pattern recognition, pp. 1701-1708, 2014.
Variani, E., et al., "Deep neural networks for small footprint text-dependent speaker verification." In Acoustics, Speech and Signal Processing (ICASSP), 2014 IEEE International Conference on, pp. 4052-4056. IEEE, 2014.
Zhang, Z., et al., "A survey of advances in biometric gait recognition." Biometric Recognition, pp. 150-158, 2011.
Office Action in U.S. Appl. No. 15/949,723 dated Apr. 17, 2020, 24 pgs.
Notice of Allowance in U.S. Appl. No. 15/949,723 dated Jul. 24, 2020, 14 pgs.

* cited by examiner

BEHAVIORAL BIOMETRIC FEATURE EXTRACTION AND VERIFICATION

STATEMENT REGARDING FEDERALLY SPONSORED RESEARCH

This invention was made with government support under contract FA8750-17-C-0014 awarded by the Department of the Air Force. The government has certain rights in the invention.

BACKGROUND

Passive user verification through behavioral biometrics is the process of affirming the identity of a user based upon the user's unique, natural interactions with a system. Typical security measures focus only on authentication and, thus, are often easily compromised (e.g. loss of token or password) or expensive (e.g. retinal scanning hardware), or they place undue burden on the end-user (e.g. multi-factor authentication) that, in turn, elicits unsafe practices (e.g. leaving a machine unlocked to avoid reauthentication). In contrast, behavioral biometrics can enhance existing authentication mechanisms, such as passwords, while constantly or continually verifying the user after login. These methods can be similarly applied to digital forensics to identify an attacker who has gained access to stolen credentials or otherwise gained unlawful access (e.g. zero-day exploit).

Most modern behavioral biometric approaches rely on manually engineered ("handcrafted") features to generate signatures to represent a user's unique patterns. These features are domain-specific and are based upon experience, intuition, and, often, trial and error. While these features may work well in controlled, laboratory experiments, many are fragile, overly complex, and fail to be robust in practice. Keystroke dynamics research has demonstrated these points by showing the decline in equal error rate (EER) for various keystroke algorithms when tested on more realistic (in that they better represent typical computer activity) datasets.

The advent of deep learning has given rise to viable automatic feature extraction methods that derive latent features from high-dimensional problem spaces with little-to-no domain knowledge. This approach has often proven to be more effective than traditional handcrafted features, revolutionizing aspects of computer vision, speech recognition, and artificial intelligence. Within the domain of biometrics, learning and feature selection have produced advances in facial and speaker recognition, yet these methods have not been applied to behavioral biometrics with the same pervasiveness or level of success.

SUMMARY

Presented herein is an automatic feature extraction framework for behavioral biometric verification based on determinate vectors output from a deep neural network. Skilled artisans recognize that deep neural networks provide pattern recognition via the passage of input through various layers of simulated neural connections. Deep neural networks typically include input and output layers, with 'hidden' layer(s) in between. Deep learning is a type of machine learning that leverages artificial intelligence. The presented automatic feature extraction framework automatically extracts a latent feature space that effectively separates the uniquenesses of individuals. Aspects generalize determinate vectors as a framework that can be readily applied to two example, but very different, behavioral verification problems: keystroke and gait.

Additionally provided is an empirical evaluation across three distinct datasets that demonstrates that the determinate vector approach described herein is more robust and outperforms modern state-of-the-art (SOA) verification methods for these modalities at least with regard to EER and data requirements.

Shortcomings of the prior art are overcome and additional advantages are provided through the provision of a computer-implemented method for gait-based behavioral verification of user identity of a subject user of a computer system. The method includes obtaining an enrollment signature corresponding to an identified user and serving as a unique identifier of the identified user, the enrollment signature including an enrollment determinate vector generated based on supplying enrollment gait data to a deep neural network, and the enrollment gait data recording a gait of the identified user. The method further includes obtaining one or more verification determinate vectors output from the deep neural network, the one or more verification determinate vectors for comparison to the enrollment signature to determine whether the subject user is the identified user corresponding to the obtained enrollment signature. The method compares the one or more verification determinate vectors to the enrollment signature and generates a probability indicator indicating a probability that gait data from a common user produced, from the deep neural network, the enrollment signature and the one or more verification determinate vectors, and indicates to the computer system whether, based on the probability indicator, the subject user is verified to be the identified user.

Also provided are systems that are configured to perform the aforementioned methods, and computer program products storing instructions for execution to perform the aforementioned methods.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
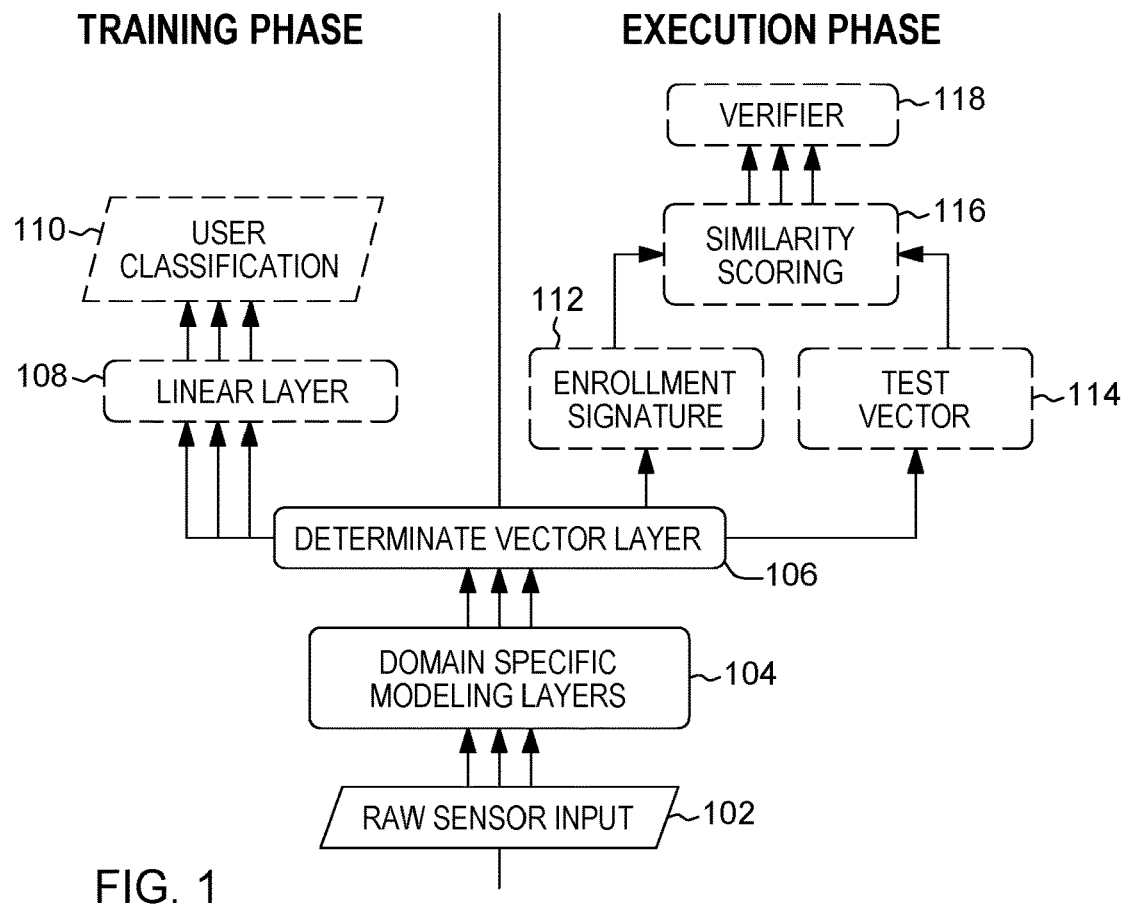
FIG. 1 depicts an example determinate vector framework, in accordance with aspects described herein.

As noted, in some approaches, handcrafted features are used for behavioral verification where a probe ("sample") composed of those features is compared against a user's signature(s) to determine if the probe data matches the patterns defined in the signature(s). The signature is a model or a distribution that describes a user's behavior in a given context, for instance keystroke timings. Engineered features in such keyboard biometric verification may be extracted from key-pairs (i.e., digraphs). For every pair, several features may be extracted, for instance key hold time of the first key (KHT1), key hold time of the second key (KHT2), and key interval time (KIT—time between the first key release and the second key press). Other derived features, such as key press latency and key release latency, may additionally be extracted. Comparing these features using a distance metric or a classification algorithm (e.g., k-Nearest Neighbors or Support Vector Machines) with equal error rate (EER), false accept rate (FAR), and false reject rate (FRR) between 0% and 20% reported depending on the sample size and outlier detection techniques. These results also vary based on the tasks that subjects perform, for instance (e.g. transcription, uncontrolled). In general, uncontrolled, "free-text" analysis is a harder problem than transcription, as user text and key-pairs are not always comparable. Though neural networks have been employed towards keyboard biometrics to improve results by estimating missing keypairs in a sample, a full deep learning approach, as described herein, may be advantageously applied to keystroke biometrics.

Gait detection through video has been studied, as has gait detection using inertial sensors, specifically those available in mobile phones, though to a lesser extent. Tri-axial accelerometers and gyroscopes may be the most commonly used mobile sensors for gait analysis. In some examples, arbitrarily-sized windows are drawn from the samples and features are extracted from these windows. Features are drawn from both the time and frequency domains, and can include the mean and standard deviation, maximum and minimum values, quartile values, spectral entropy and median frequency along all three axes and the magnitude domain, as examples. Classification algorithms may then be applied to these features, and each window classified.

While handcrafted features can be effective, they typically require a well-defined connection between the data and behavioral models, excessive data filtering, and extensive outlier detection. Difficulties also arise in finding features that capture the signal, as opposed to the noise, of the model. These shortcomings have been demonstrated on several occasions by keystroke dynamics researchers. For instance, algorithms reported by seven different studies, whose results were not directly comparable due to the disparate datasets and processing techniques, were compared. When run on the same dataset, most results varied from initial reportings (e.g., one-class support vector machine (SVM) with zero-miss false acceptance rate (FAR) was reported with a false reject rate (FRR) of 0.157, but produced a 0.504 on the new dataset; reported k-Means equal error rate (EER) of 0.038 went to 0.372). A similar approach compared a verification algorithm against four datasets, one of which was a dataset of 103 users collected over 2.5 years from subjects' personal machines during normal interactions. The algorithm, which had produced an EER of 0.0217 when run on a tightly controlled, laboratory dataset, produced an EER of 0.1036 when run on the new, more realistic dataset.

Automatic feature extraction removes these requirements and minimizes bias introduced by human-defined features. Determinate vectors have been utilized for speaker verification, in which speech processing and a small deep neural network (DNN) are used to perform automatic feature extraction to derive a feature set for speaker representations that outperforms standard methods and is more robust to noise. Another example method implemented an alternative end-to-end approach for training determinate vector representations, which trains the model directly on the verification task rather than using an intermediary classification step. This approach introduces several layers of complexity to produce statistically significant, yet marginal, improvements to accuracy. In contrast, aspects described herein provide an accurate architecture that operates independent of the data type.

Described herein are approaches for generalizing determinate vectors beyond, e.g., speaker verification, and applying them as a framework for training and employing deep neural networks to various verification problems. FIG. 1 depicts an example determinate vector framework in accordance with aspects described herein. The architecture employs a base DNN model (DNN and DNN "model" may be used interchangeably herein) that feeds two distinct phases: training and execution. In the training phase, DNN parameters are tuned to learn the latent feature space described by the determinate vector. This is followed by an execution phase where determinate vector values are used as signatures and similarity scores are calculated to perform user identity verification.

The architecture of FIG. 1 lays out a general approach for building a deep neural network for behavioral verification of user identity as described herein. Particular example approaches for such behavioral verification of user identify are keystroke-based and gait-based, each being described in further detail herein. Generally, the building includes receiving the keystroke or movement data, as the case may be, preprocessing the data to place it into a proper format for processing by the deep neural network to extract local patterns, and then training the deep neural network from that preprocessed data. In the execution phase, the trained model is used to produce test (or 'verification') determinate vector(s) for comparison to enrollment signatures(s) that were built from determinate vectors when enrolling an identified user. The comparison produces a similarity score indicative of how similar the test determinate vector(s) are to the enrollment signature, thereby indicating the likelihood that the vectors were output from the DNN based on data generated from a common user.

Thus, both phases share a common base DNN model. The model starts with raw sensor input 102 that accepts sensor readings from whichever modality of biometrics (e.g. keystroke, gait) is being measured. This is followed by domain specific modeling layers 104 that contain pre-processing techniques. The raw data is transformed into a usable format for feeding to the DNN, which is to be carefully designed to appropriately model the problem. For the two biometric modalities applied to the framework as described herein—keystroke and gait—further details are provided herein on the design of these layers, the design being specific to the particular domain/modality involved. The model ends at the determinate vector layer 106 which, once trained, describes a point in a latent feature space that is highly discriminative between subjects.

An objective of the training phase is to tune the base model to learn and extract the latent feature space that can generalize beyond the users that were in the training corpus. The DNN is trained to identify the interesting features that help identify a particular person from their data input to the DNN. As is described in further detail below, and additional "Linear Layer" 108 having a linear activation function is appended to the deep neural network. The Linear Layer includes, as an example, a one-dimensional vector of length n, where n is equal to the number of subjects in the training corpus of, e.g., keystroke data of recorded keystroke events or user movement data, as examples. The Linear Layer is used to train the DNN as an n-class classification problem using logistic regression to learn linearly-separable features for identifying/classifying users (110). The Linear Layer includes output nodes of the DNN and each output node on the Linear Layer corresponds to the predicted probability that a specific subject created the given data sample, e.g. that a keystroke or movement data sample is for a specific subject user.

The appended layer is used in identifying which specific user, represented in the dataset, that subject data came from. The preceding layer(s) of the DNN are used to indicate the 'interesting features' that are to identify a specific user, in the form of a determinate vector, and the appended layer is used to interpret the determinate vector and verify whether the identification of the user is correct. It is the preceding layer(s) of the DNN, rather than the appended Linear Layer, that are being trained over time. The training generalizes the training dataset to a larger population by learning the generic features that can be used to help separate data from any user, not just the users represented in the training data corpus. The appended layer aids in the feature extraction, i.e. the network learning the features that are linearly separable. After the DNN is trained, the appended layer is discarded.

The DNN can be optimized and trained using a cross entropy loss function on the prediction error. In this manner, the classification training process can automatically extract features that are discriminative between the various subjects in the training corpus and that generalize well, assuming that the training corpus is sufficiently representative of the intended target population.

Once training is complete, the Linear Layer is discarded to obtain a trained DNN that translates subject data into points within the discriminative determinate vector space. The trained DNN is thereby provided for behavioral verification of user identity based on determinate vectors output from the trained deep neural network, as explained with regard to the execution phase. "Provision" of the trained DNN encompasses not only the obtaining of the trained DNN by the machine or system performing the training, but also encompasses actions to provide, send, or otherwise make available the DNN, e.g. any requisite data structures, files, models, and so on, to a computer system that receives/accesses and uses the trained DNN. Thus, in some examples described herein, the provision of the trained deep neural network sends the trained deep neural network to a computer system (such as a client mobile device) on which user identity of a subject user of the computer system is to be verified as being an identified user. As an example, the client system can acquire data and use that to verify that the user using or wearing the client device is an authorized user, i.e. an identified user.

The trained DNN model can be employed in the execution phase which includes subject enrollment (signature generation) and similarity evaluations (comparison of verification determinate vector samples against a signature). An example subject enrollment obtains multiple determinate vector samples from a single subject user based on supplying enrollment data (e.g. keystroke or gait data) to the DNN for processing. The multiple determinate vectors can be averaged to produce a single enrollment determinate vector that can be used as an enrollment signature for that subject user. In other words, the enrollment signature is what is used to represent some identified user in verification tests to test whether a current user is the identified user. Using the keystroke verification example, each determinate vector sample may be an output from the DNN, representative of a sample of key events (e.g. 250 in examples herein) fed to the DNN for determinate vector generation. In a particular example, five determinate vectors from data of the same user are combined/averaged to create the enrollment signature.

Once this enrollment signature 112 is collected, it can be verified against one or more test vectors (also referred to herein as verification determinate vectors) 114 using similarity measures to verify whether the test vector(s) are from the same identified user as the enrollment signature. The verification determinate vector(s) correspond to a subject user whose identity is to be verified. These vector(s) are output from the DNN based on supplying data, e.g., keystroke or gait data, of the subject user to the DNN. The vector(s) are obtained for comparison to the enrollment signature to determine whether the subject user is an identified user whose enrollment signature is being tested against.

The verification is accomplished by a similarity scoring function 116 of the architecture of FIG. 1, the function indicating a level of similarity between the verification determinate vector(s) and the enrollment signature. A verifier 118, for instance, executes to verify, based on the similarity scoring, whether the data generating the test vector(s) and data generating the enrollment signature were from a common user, i.e. whether the subject user and user identified by the enrollment signature are the same user. By comparing the verification determinate vector(s) to the enrollment signature, the similarity scoring function generates a probability indicator indicating a probability that the data from a common user produced, from the deep neural network, the enrollment signature and the verification determinate vector(s).

The similarity scoring approach uses, in a particular example, a combination of three scoring measures: cosine similarity as between the verification determinate vector(s) and the enrollment signature, $L^2$ distance (a generalized term for the Euclidean norm) as between the verification determinate vector(s) and the enrollment signature, and z-score of the verification determinate vector(s) relative to the enrollment signature. The $L^2$ distance and z-score measures generally increase the accuracy of the approach over cosine similarity alone. These three scores may be combined as features to a linear binary logistic regression classifier (e.g. verifier 118) that learns an appropriate threshold for verifying whether the signature and verification determinate vector(s) are from a common user (i.e. the subject user is the user identified by the enrollment signature). Verifier 118 can be trained by reusing the original training corpus or a secondary corpus.

The output from verification tests can be interpreted as the probability that the test vector is from the same subject as an enrollment signature. This can be provided as an indication to a computer system and used for any desired purpose, for instance to determine whether a user using the computer system (e.g. typing on the keyboard or wearing the device while walking, for instance) is authorized to used the computer system and/or particular functionalities thereof, or a resource provided by or through the computer system, for instance access to a remote service via that computer system.

Multiple results can readily be combined through Bayesian averaging, allowing the determinate vector approach to take advantage of additional test vectors (assumed to be from the same subject) to increase accuracy of verification. The verification determinate vector(s) can therefore include multiple verification determinate vectors, where the comparing compares each such verification determinate vector to the enrollment signature to determine a respective probability indicator corresponding to that verification determinate vector. The generated probability indicator can be calculated as a composite of the respective probability indicators corresponding to the verification determinate vectors.

While the training of the DNN might be computationally intensive, its execution is likely much less intensive. Models may be trained once and used multiple times, reducing the overall computational costs. Further, the determinate vectors themselves are sparse and compress well compared to the sensor data. This minimizes the potential impact to storage and transmission constraints when employing the approach. For instance, in cases where the approach was used to secure a service or validate identity of a user of a device, data samples may be collected by the device and used with the DNN to periodically or aperiodically verify that the same (authorized) user is using the device. This can be done, at least in part, remotely, which may be desired in the enterprise setting when enterprise client devices are used in the field. The device could use the DNN to compute verification determinate vectors that it sends to a remote server that has the enrollment signature and that performs the similarity scoring and verification to ensure that the user of the device is authorized. The determinate vector(s) condense the sensed data down to a relatively small amount of information that is easy to store or transmit. Though transfer of that raw data to the remote server and generation of the verification determinate vectors on the remote server is a possibility, verification determinate vector generation on the client using the DNN would be relatively inexpensive in terms of resources used.

In addition, enrollment could be performed on the user device, in which the trained DNN residing on the user's device generates that user's enrollment signature and sends it to the remote server to perform verification against later-obtained test vectors. In other examples, the verification could be performed on the user's device in addition, or as an alternative to, any verification by a remote server.

In short, use of the DNN for enrollment (including generation of enrollment determinate vectors), use of the DNN for generation of verification determinate vectors, and the verification itself are all aspects that could be performed by the user's device, a remote device, or some combination of devices that might include the user's device, remote device, and/or another other devices, depending on the circumstances.

Additional details of keystroke-based and gait-based verification are now described. While the determinate vector framework itself is data-agnostic, its success depends on the design and implementation of an appropriate model for data type. The model should be carefully designed to capture the relevant patterns within the data. Described herein is a design for a DNN model of keystroke data that captures more information than prior methods and produces more accurate results.

As discussed above, classical approaches to keystroke verification use aggregate key-pair timing statistics to model these parameters. A major shortcoming of this approach is that the statistics do not model long-term (beyond two keys) inter-key patterns that may be present in keystroke data. However, such patterns can provide valuable verification information that can be automatically extracted using an appropriate model.

The keystroke data ingested by the keystroke model described herein was collected by recording keystroke events that occur every time a key is pressed or released. Three values/indicators are recorded for each such keystroke event: whether the event was a key press or key release, the unique key identifier of the key pressed or released, and a timestamp of the keystroke event in milliseconds or any other desired unit. Once collected, pre-processing is performed on the recorded keystroke events before feeding the data to the model. The pre-processing provides data structures (e.g. matrices as described below) representing sequential key events for processing by the DNN to extract local patterns. As part of the pre-processing, the timestamps are converted to relative times; the first keystroke in a session is discarded and the other time values are calculated as deltas representing the difference in timestamps between each key event, $\Delta t$. Next, any $\Delta t$ greater than a predefined threshold amount of time, for instance 500 ms, is removed. The threshold can represent a sufficiently long pause not reflective of fluid typing motions. Finally, the remaining $\Delta t$ values are normalized into scores between zero and one using an exponential distribution function. Key timings follow an exponential distribution, so the mean of the training dataset is taken and values are transformed using the exponential cumulative distribution function set forth as:

$$y=1-e^{-\lambda \Delta t} \qquad (\text{Eq.1})$$

where y is the transformed timing value and $\lambda$ is the mean.

Figure 2:
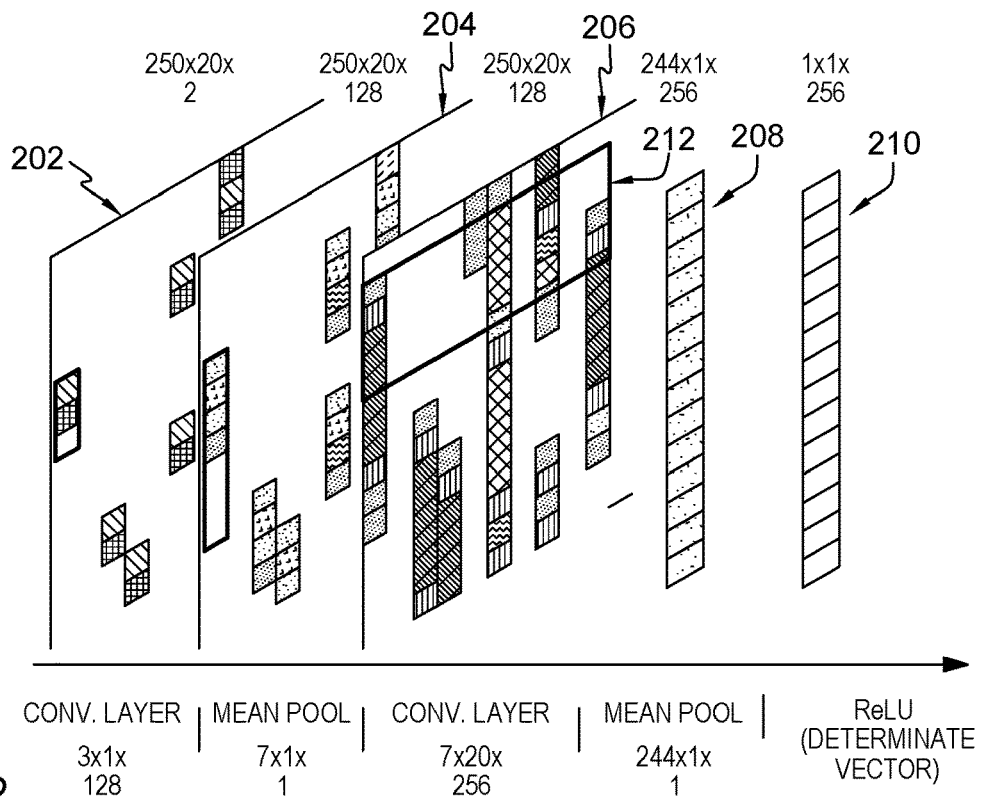
FIG. 2 depicts a deep neural network architecture for keystroke-based behavioral verification of user identity, in accordance with aspects described herein.

FIG. 2 depicts a deep neural network architecture for keystroke-based behavioral verification of user identity, in accordance with aspects described herein. The architecture includes first convolution layer 202, first mean pool layer 204, second convolution layer 206, second mean pool layer 208, and Rectified Linear Unit (ReLU) (determinate vector) layer 210. The boxes represent a convolutional filter, top dimensions (shown above each layer) and images represent layer input, and bottom dimensions (shown below each layer) represent the size of a filter.

The model can capture local patterns, occurring within a relatively small window of time, from key event timings. In the second convolution layer 206, the rectangular line box 212 extending horizontally is an example multi-key window. The model trains windows to look for patterns in the data and slides the windows down the entire set of 250-key (in this example) data. If it finds a pattern that is legitimate, it gets activated to a portion. This is to find the sequences of patterns, and there are several those—128 in this example. As such, conversion is performed as part of the preprocessing to produce data structures. Example data structures are three-dimensional sparse matrices of sequential key events that are modeled by a deep convolutional neural network that can extract those patterns. In the matrices, rows are through time, columns are through the keyspace, and depth is through the event type, with m non-zero values, where m is the number of events—250 by default. The conversion sets the keystroke data up to be pushed into the DNN.

The matrices are, using the example of FIG. 2, 250×20×2 pixels and composed of 250 sequential key events (rows) by the top 20 most frequently used keys (column) by the event type (pattern fill). Only events from the top 20 most used keys are used, as including additional keys can make the matrices too sparse. Pattern fills in the matrices represent the event type, some representing a key press and others representing a key release. The intensity of pixel values are the y term from Eq. 1.

Once the data has been converted to the matrices, the DNN may be trained by feeding the matrices of sequential key events into the DNN for feature extraction. The feature extraction includes applying a first convolution filter 202 and second convolution filter 206. The first convolution layer 202 in the model is designed to detect features from a single key press and release series of events. Users who type quickly or use various hot-keys often produce keys that are out of sequence, in that the press of one key is followed by the press of another, rather than the release of the first. In an analysis of keystroke data, it was found that press and release events for a single key generally occur within three events of one another, so 128 convolutional filters of size 3×1 and stride 1 are used (see FIG. 2 layer 202) to extract these features. This layer is followed by the first mean pooling layer 204, which is performed across seven rows—determined through empirical evaluation—in each column. This operation stretches the events over multiple rows increasing the overlap of events between keys.

The second convolution layer 206 extracts features across a fixed number of keystrokes within a given duration of time. As the first convolution layer 202 looked at an individual key, the second convolutional layer 206 attempts to find patterns for common sequences of keys. 256 convolutional filters of size 7×20 and stride 1 are used in this layer to discover features that describe how subjects type certain sequences of keys.

The second convolution layer 206 also reduces the dimensionality of the matrix by not using padding, which reduces the number of columns to one and produces six fewer rows than the input matrix. The last layer of the CNN is the second mean pool 208. Functionally, it removes dependence on location (within the matrix) of the sequence of keys that activated the filter. It then feeds into a final ReLU activated layer 210 that serves as the determinate vector layer. Dropout may be applied aggressively, for instance 75%, to this last layer to prevent over-fitting.

When performing the keystroke execution phase for keystroke-based behavioral verification of user identity of a subject user of a computer system, similar preprocessing of recorded keystroke events is performed and the processed data is fed into the DNN for determinate vector output, the output determinate vector(s) being verification determinate vector(s). Thus, to obtain the verification determinate vectors, a process can receive recorded keystroke events, each recorded keystroke event including (i) an indication of whether the recorded keystroke event is a key press or a key release, (ii) a key identifier of the respective key pressed or released, and (iii) a timestamp of the recorded keystroke event. Then, pre-processing of the recorded keystroke events is performed to provide verification keystroke data as data structures representing sequential key events for processing by the deep neural network to extract local patterns. The pre-processing includes, as described above, obtaining processed keystroke event data by (i) converting the timestamps of the recorded keystroke events to relative times and determining a collection of deltas representing differences in times between consecutive key events, and (ii) normalizing at least some deltas of the collection of deltas to a normal distribution using an exponential distribution function, where one or more deltas, of the collection of deltas, exceeding a predefined threshold amount of time are not included in the at least some deltas that are transformed by the normalizing. The processed keystroke event data is then converted into the verification keystroke data that is supplied to the deep neural network to obtain the verification determinate vector(s).

In some embodiments, the computer system being used by the subject user whose identity is to be verified obtains the verification keystroke data and supplies the verification keystroke data to a remote computer system, receiving in response the verification determinate vector(s). Alternatively, the computer system has the DNN and generates the verification determinate vector(s) itself. The computer system can further perform the comparison of the verification determinate vector(s) to the enrollment signature (or send the verification determinate vector(s) off to a remote device for such comparison). In any case, it can be indicated to the computer system (i.e. by itself or by the remote device) whether the subject user is or is not verified to be some identified user, for instance the authorized user of the device.

The determinate vector framework is also applied to mobile gait verification in accordance with aspects described herein. Visual gait verification examines video for features, whereas the features for mobile gait verification as described herein are extracted from sensors, such as accelerometer and/or gyroscopic sensors, placed directly on the subject and/or in a mobile device of the subject. Aspects seek to determine if there are regular, unique patterns in how an individual walks that can be reliably detected by an inertial sensor and used to verify or identify a subject. Advantages are provided over standard signal processing to extract features based upon frequency and power of the signals because the DNN model described herein extracts a more discriminative latent feature space for verification.

Initially, movement data describing movement, in multiple dimensions, of computer system(s) (e.g. mobile device(s)) of user(s), are received. The movement data includes sensor data acquired from sensor(s) of the computer system(s). In these examples, data is obtained in the x, y, and z axes from both the accelerometer (in units of meters per second-squared) and gyroscope (in units of radians per second) of a mobile phone placed in the subject's hip pocket. For both sensors, readings are sampled at regular intervals several times a second, for instance in the range of 50 to 100 Hz. The values for each sensor reading may be heavily dependent on the orientation and manufacturer of the device. If the issues this presents are not mitigated, these dependencies can lead to misleading results (i.e., the learning algorithms pickup on the orientation of a device in an individual's pocket). Pre-processing of the movement data is performed that provides processed movement data for processing by the deep neural network to extract local patterns. Part of this preprocessing is to eliminate orientation dependencies, in which only the magnitude of the accelerometer and gyroscope data is used. Therefore, the pre-processing includes determining magnitudes of the movement data as a composite of movement in x, y, and z dimensions, e.g.:

$$\sqrt{x^2+y^2+z^2}$$

Subtracted from at least some of the magnitudes is a constant (9.8 meters per second-squared) representing gravitational force to remove gravity from the accelerometer magnitude. Following this procedure, just the two magnitude signals remain as the input source. These signals are further processed by applying a third-order median filter to remove individual noise spikes and a ninth-order moving average filter to remove environmental noise.

Figure 3:
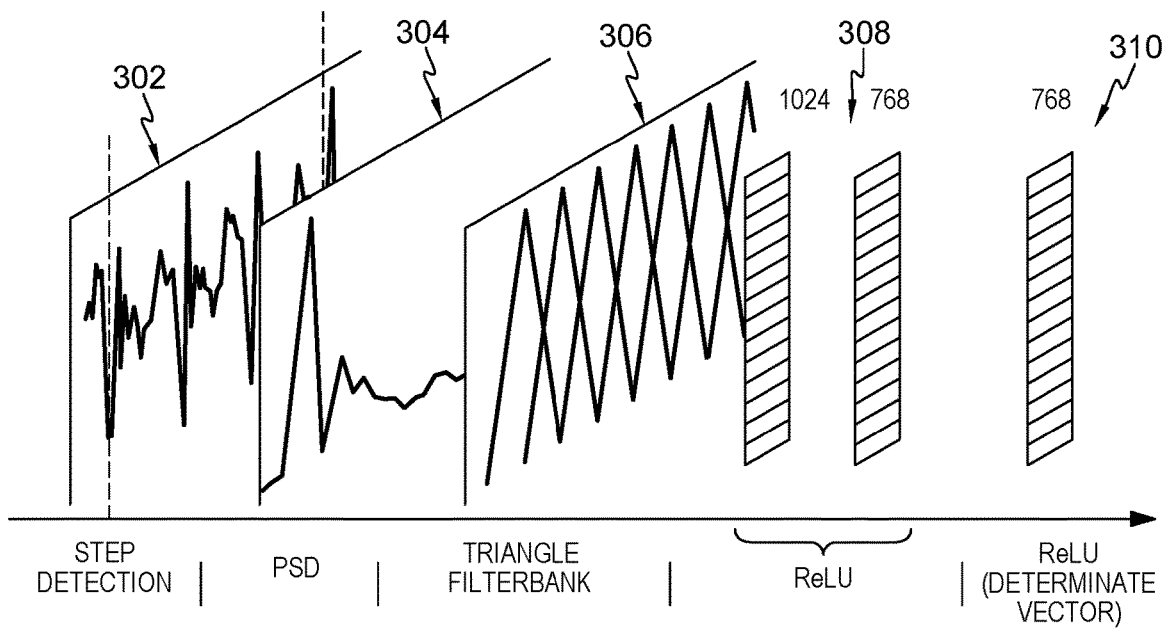
FIG. 3 depicts a pre-processing and deep neural network architecture for gait-based behavioral verification of user identity, in accordance with aspects described herein.

FIG. 3 depicts a pre-processing and deep neural network architecture for gait-based behavioral verification of user identity, in accordance with aspects described herein. Following the initial transformations and noise reduction steps, the data can be processed by the mobile gait model shown in FIG. 3. As with the keystroke model, a goal is to extract features for user verification and identification using minimal data. Rather than using fixed-time windows for the samples, which may or may not contain enough relevant step data, the pre-processing of the data further includes performing step detection against at least some of the movement data to isolate samples of movement data having a given (e.g. six) number of consecutive steps that the corresponding user has taken. In selecting the number of steps, e.g. 6, the assumption is that this number of sequential steps provides a sufficient window to exhibit identifiable features in walking data.

As a first step in isolating sample frames with six steps, a search is conducted for local minima of order 60 (in this example) in the accelerometer readings. Once the minima are detected, the values between the local minima are considered to be a part of a step pair—both a left and right step. Further, these steps are to have local minima no more than a given number of (e.g. two) seconds apart and the magnitude of the accelerometer is to exceed (in this example) 1.5 meters per second-squared during the step. These parameters may be determined through any desired or appropriate manner, for instance visual inspection of the data.

The detected minima correspond only to either left or right steps based on which pocket the mobile phone is in. The minima for the opposite leg is significantly less pronounced and, thus, more difficult to detect, so the two are combined into one step pair in accordance with aspects described herein. Step detection is performed only on the accelerometer data, however, as the gyroscope and accelerometer readings are synchronized, the data may be framed in identical locations. The left-most graph 302 in FIG. 3 shows typical accelerometer data with a six-step sample identified between the dashed lines.

Next, signal processing features are extracted from the samples. It is assumed that the discriminative patterns are periodic, so signal processing features are appropriate for modeling such patterns. These features are extracted in two stages: (i) A periodogram estimating a power spectral density (PSD) is obtained (shown as second PSD graph 304 in FIG. 3), and (ii) the power spectrum produced by the PSD periodogram is fed into a triangular filterbank (the third graph 306 of FIG. 3) to produce a fixed-length set of features. This process is based on the Mel-Frequency Cepstrum Coefficient (MFCC) method used in speech processing to summarize the strength of the signal in each frequency. However, unlike in speech processing, the high-frequency values in gait signals are assumed to be noise. As such, power spectra above a predefined frequency (e.g. 10 Hz) is filtered-out as noise. Also, as only the low frequency bands are used, log scaling is not performed. The filterbank allows for comparison of sequences of different lengths, which is advantageous because the number of spectral values in a sample varies based on the characteristics of a subject's step.

The extraction of the signals also includes establishing filterbank coefficients by creating a triangular filterbank across the frequencies in the PSD for each step in a sample, and creating overlapping filters (e.g. 10 filters) equally spaced between selected low (e.g. 0.5 Hz) and selected high (e.g. 10 Hz) frequencies. Each filter has a peak at one. Filter coefficients are multiplied with the spectral density at each frequency and aggregated to calculate each filter value. These filters produce 20 values (10 each for accelerometer and gyroscope) and serve as the input for the DNN model.

The DNN in this model of FIG. 3 includes the three fully-connected ReLU activated layers shown as 308 and 310 in FIG. 3. Not shown in FIG. 3 is the appended linear layer discussed above, which is removed after training. The training includes feeding the processed movement data into the deep neural network for feature extraction. During the training process, the dataset is cycled back (to the first ReLU layer, immediately following the triangle filterbank) through the DNN multiple times. The parameters of the three ReLU layers 308 and 310 are updated and parameters in the previous processing steps (302, 304, 306) are fixed. The connected ReLU activated layers perform additional feature extraction on the signal processing features extracted from the samples by these initial steps 302, 304, 306.

The DNN provides the determinate vectors framework with a model for extracting latent space features from the signal features. The size of each ReLU layer is shown in FIG. 3. Finally, dropout can be applied to each DNN layer, for instance 50% on the layer immediately following the triangle filterbank, and 75% on the remaining two ReLU layers, to prevent over-fitting.

When performing the execution phase for gait-based behavioral verification of user identity of a subject user of a computer system, similar preprocessing of movement data is performed and the processed data is fed into the DNN for determinate vector output, the output determinate vector(s) being verification determinate vector(s). Thus, to obtain the verification determinate vectors, a process can receive movement data describing movement of the computer system in multiple dimensions, the movement data including the sensor data, the sensor data acquired from one or more sensors of the computer system. Pre-processing of the movement data is performed to provide verification gait data as processed movement data for processing by the deep neural network to extract local patterns. The pre-processing can determine magnitudes of the movement data as a composite of movement in x, y, and z dimensions, filter out individual spikes in magnitude above a threshold as noise, perform step detection against at least some of the movement data, the step detection isolating samples of movement data having a given number of consecutive steps that corresponding users have taken, and extract signal processing features from the samples. The verification gait data records a gait of the subject user, and this is supplied to the deep neural network to obtain, as output, the verification determinate vector(s).

The computer system being used by the subject user whose identity is to be verified in some embodiments obtains the verification gait data and supplies the verification gait data to a remote computer system, receiving in response the verification determinate vector(s). Alternatively, the computer system has the DNN and generates the verification determinate vector(s) itself. The computer system can further perform the comparison of the verification determinate vector(s) to the enrollment signature (or send the verification determinate vector(s) off to a remote device for such comparison). In any case, it can be indicated to the computer system (i.e. by itself or by the remote device) whether the subject user is or is not verified to be some identified user, for instance the authorized user of the device.

Below are details of an empirical study of effectiveness of the behavioral verification approaches laid out herein. Described are a series of experiments that demonstrate that the determinate vector framework can be applied to two distinctly different biometric verification problems (keystroke, gait) and that it also surpasses the performance of prior state-of-the-art approaches in both domains. The two algorithms against which the described approaches are compared are a comparison keystroke verification algorithm referred to as G&P and a comparison mobile gait verification algorithm referred to as Lu. These algorithms are compared with approaches described herein by accuracy, EER, robustness, and data efficiency.

Datasets—Three datasets are used to evaluate the robustness of the approaches and how their performance generalizes. The first dataset (MultiMod) is non-public and contains both keystroke and gait data, which is described in further detail below. The other two datasets are publicly available datasets as benchmarks—one for keystroke (Clarkson) and one for gait (UCI).

For the MultiMod dataset, employed was a multi-phase experiment that is designed to replicate real-world activities to ensure that model accuracy remained high in practice. 104 subjects performed a series of tasks on a desktop, smartphone, and tablet to produce fixed-text keystrokes, free-text keystrokes, and movement data. For fixed-text, the subjects transcribed three sentences that included the most common key pairs to ensure sufficient pairs for comparison both between users and devices. Free-text keystroke data was produced from online shopping and survey questions and movement data was collected by smartphones while subjects walked a track. The dataset contains approximately 1,200,000 desktop key events, representing 4,242 samples, where a sample is 250 sequential key events, (Mean per user 41.588, Min. 15, Std. Dev. 7.959) and approximately 1,900,000 mobile (smartphone and tablet) key events, representing 4,645 samples (Mean per user 44.663, Min. 25, Std. Dev. 10.486). Accelerometer and gyroscope data was collected at 100 Hz. This MultiMod dataset contains approximately 147,200,000 movement events, of which 19,806,744 are walking motion events, divided evenly between accelerometer and gyroscope, representing 28,300 samples, where a sample is six steps of walking data (Mean per user 272.115, Min. 123, Std. Dev. 49.82).

The Clarkson benchmark keystroke dataset consists of data from 103 users collected over 2.5 years from subjects' personal machines during normal interactions, representing a realistic use case. The dataset includes 87 users with sufficient data. There are 40,380 total samples, with a mean of 484 samples per user (Std. Dev. 587). The number of samples per user varied significantly from the MultiMod dataset, as subjects could enable or disable the keylogger at any time.

Finally, the UCI dataset is used as a benchmark for mobile gait. Unlike the MultiMod dataset, it was collected at a sampling rate of 50 Hz. As with MultiMod, only the walking data from this dataset is used. There are 1,769 total extracted samples from 30 users in the dataset, with a mean of 59 samples per user (Std. Dev. 14).

Keystroke Verification Results—The determinate vector keystroke verification approach was compared with the G&P approach. The G&P approach is based upon the traditional handcrafted key-pair features, described above, and provides a good contrast with the automatic feature extraction based method described herein. To train the determinate vectors models, the subjects are randomly partitioned into 70% for training and 30% for testing. In doing so, all testing is performed on users that the framework has never seen, in order to demonstrate that the extracted determinate vector features can discriminate universally.

During testing, five randomly selected samples are used as enrollment samples for each user. Unlike in the determinate vectors approach, G&P does not require a separate training phase. Instead, it performs a pair-wise comparison of all enrolled subjects with a sample from an unlabeled subject (assumed to be an enrolled subject). For a fair comparison, five random samples (without replacement) were taken for each subject to create enrollment signatures. When testing, samples from the same 30% split of subjects used with determinate vectors are used with G&P to ensure fairness.

Verification is performed by comparing enrollment signatures of the testing subjects against the remaining samples from the testing subjects. Performance of each method can be increased if additional samples, from the same subject, are used as test vectors and results combined. To demonstrate the performance increase, experiments using test vectors from one (1) and five (5) samples were performed. Each experiment is run 10 times using different random seeds.

TABLE 1

Keystroke Verification Results

| | EER % Dataset | | | |
|---|---|---|---|---|
| | MultiMod | | Clarkson | |
| # Test Vec. | 1 | 5 | 1 | 5 |
| Determinate Vector | 11.5 ± 0.2 | 7.7 ± 0.6 | 15.3 ± 1.0 | 8.7 ± 1.1 |
| G&P | — | 26.3 ± 4.9 | — | 26.1 ± 4.6 |

Thus, Table 1 above provides keystroke verification results comparing the determinate vector approach with the G&P algorithm using one (1) and five (5) samples as test vectors. Standard deviation of the results are provided. Dashed results (–) indicate the approach failed. On the MultiMod dataset, determinate vectors greatly exceeds the performance of G&P, achieving an EER of just 11.5% using one (1) sample for a test vector and 7.7% when five (5) samples are used. Whereas, G&P manages just 26.3% EER using five samples of data as a test sample and fails entirely when only one sample is used. The reason for the failure is that there are not consistently enough matching bi-grams in enrollments and test samples of that size for G&P to compute its similarity measures accurately. Our approach is not burdened by this constraint. Results are similar on the Clarkson dataset, where determinate vectors achieves 15.3% and 8.7% respectively and G&P achieves just 26.1%. The slight drop in determinate vectors performance on the Clarkson dataset is not unexpected, as the data is from unstructured activities and, as such, those results are more indicative of real-world performance.

The performance of the G&P approach on the Clarkson dataset is worse than the 10.4% of a previous study because 10,000 keystroke events were used for enrollments and 1,000 keystroke events were used as samples for test vectors in that study. This and G&P's inability to use small data samples demonstrates the data efficiency of determinate vectors, in that it can achieve similar or greater performance using far less data for enrollment and testing. Further, determinate vectors scales more effectively as the number of enrolled subjects increases. Calculating the similarity measures using determinate vectors is a linear time operation requiring just O(n+m) operations per verification test, whereas G&P is an O(n²m) operation where m is the number of enrolled subjects and n is the number of samples per enrollment. This difference translated to dramatic differences in run times. On a modern dual-CPU machine with GPU acceleration the determinate vectors method took a few hours to train and a few minutes to perform all the tests, whereas the G&P implementation took more than three days to compute these results.

Mobile Gait Verification Results—In the second set of experiments, the determinate vectors mobile gait verification approach is compared to the Lu approach. These results emphasize the significance of the determinate vectors approach as a framework for extracting discriminative features rather than simply improvements to the model. The main distinctions between the data processing model of the determinate vectors method and the Lu model are the manner in which the models are trained and the fact that the determinate vector approach performs additional feature extraction with the DNN layers (beyond the signal processing steps), whereas the Lu approach uses a Gaussian Mixture Model. Also, MFCC features are extracted using the full speech method in the Lu approach, which includes the higher frequency space and log scaling.

To perform a fair comparison, the data is framed using the same step detection technique described above. A training-test split of 70/30% of the subject data is performed on the MultiMod dataset, similar to what was done in the keystroke experiments. In this case, both methods have training and execution phases and use the same data split. The UCI dataset does not contain enough data for an effective train and test of the method. As such, all UCI data was used in verification tests using models pre-trained on the MultiMod dataset. Again, enrollment signatures included five samples and all experiments were run 10 times using different random seeds for selection.

TABLE 2

Gait Verification Results

| | EER % Dataset | | | |
|---|---|---|---|---|
| | MultiMod | | UCI | |
| # Test Vec. | 1 | 5 | 1 | 5 |
| Determinate Vector | 17.5 ± 0.5 | 7.0 ± 1.5 | 15.3 ± 1.4 | 11.4 ± 2.3 |
| Lu | 27.0 ± 0.7 | 24.2 ± 1.4 | 28.2 ± 0.2 | 24.0 ± 1.3 |

Thus, Table 2 above provides mobile gait verification results comparing the determinate vector approach with the Lu algorithm using one (1) and five (5) samples as test vectors. Standard deviation of the results are provided. Determinate vectors surpass the Lu method by 10% on both datasets using just 1 sample to produce test vectors. If 5 samples are used, the difference in performance becomes much more pronounced. The determinate vector approach benefits greatly from the additional data, reducing EER by 10% on the MultiMod dataset and 4% on UCI, whereas the Lu method does not benefit nearly as much.

Finally, the models for the UCI experiments are trained on the MultiMod dataset due to its small number of subjects. Despite being trained on a different dataset, the models from each approach generalized and transferred well, which supports the assertion that the determinate vectors automatically extracts and learns discriminative features that generalizes well.

Figure 4:
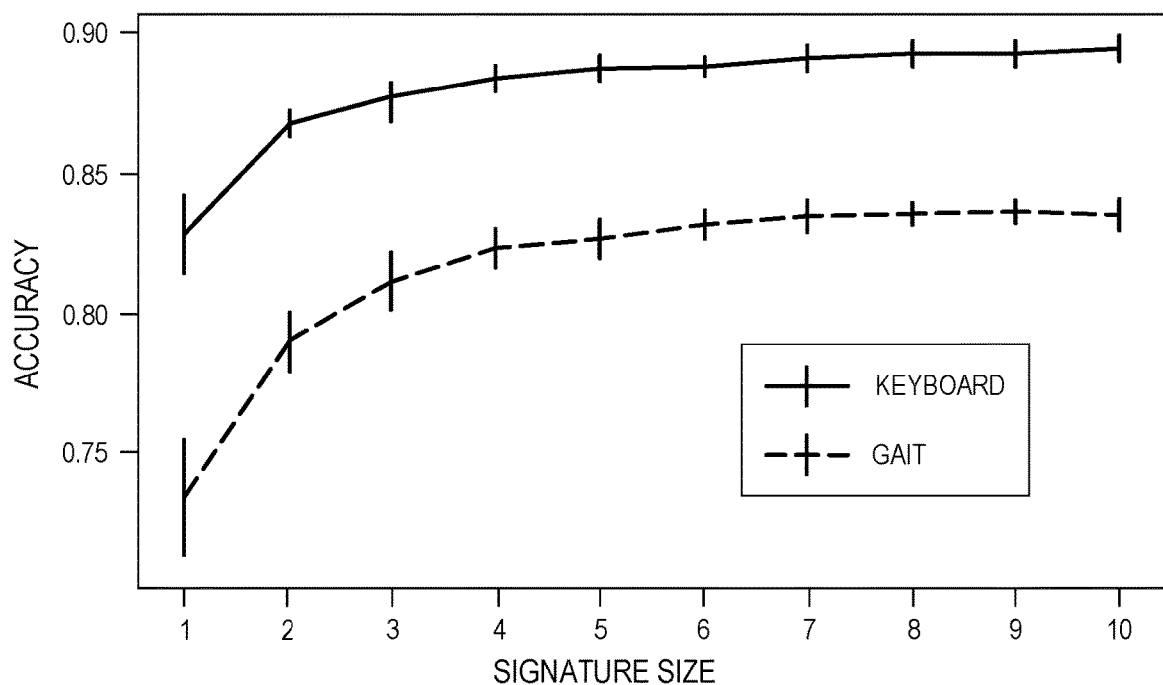
FIG. 4 depicts determinate vector accuracy for a sample test vector while varying an enrollment signature size, in accordance with aspects described herein.

Determinate vector performance considerations—In the next series of experiments, multiple aspects of the determinate vectors approach are examined that impact performance. The first of these factors is the amount of data used to produce an enrollment signature. Ideally, an enrollment signature requires minimal data to increase the practicality of the approach. FIG. 4 depicts determinate vector accuracy for a sample test vector while varying an enrollment signature size, in accordance with aspects described herein. Accuracy is displayed as the inverse of EER. FIG. 4 shows the effect of increasing the number of samples in an enrollment signature on verification accuracy in both domains (keystroke, gait) using the MultiMod dataset. Accuracy of the approach increases significantly until the signature is about five samples. Afterwards, there appears to be marginal returns for increasing the size of the signatures.

Even signatures composed of a single sample are accurate and further demonstrate the data efficiency of the approach.

Figure 5:
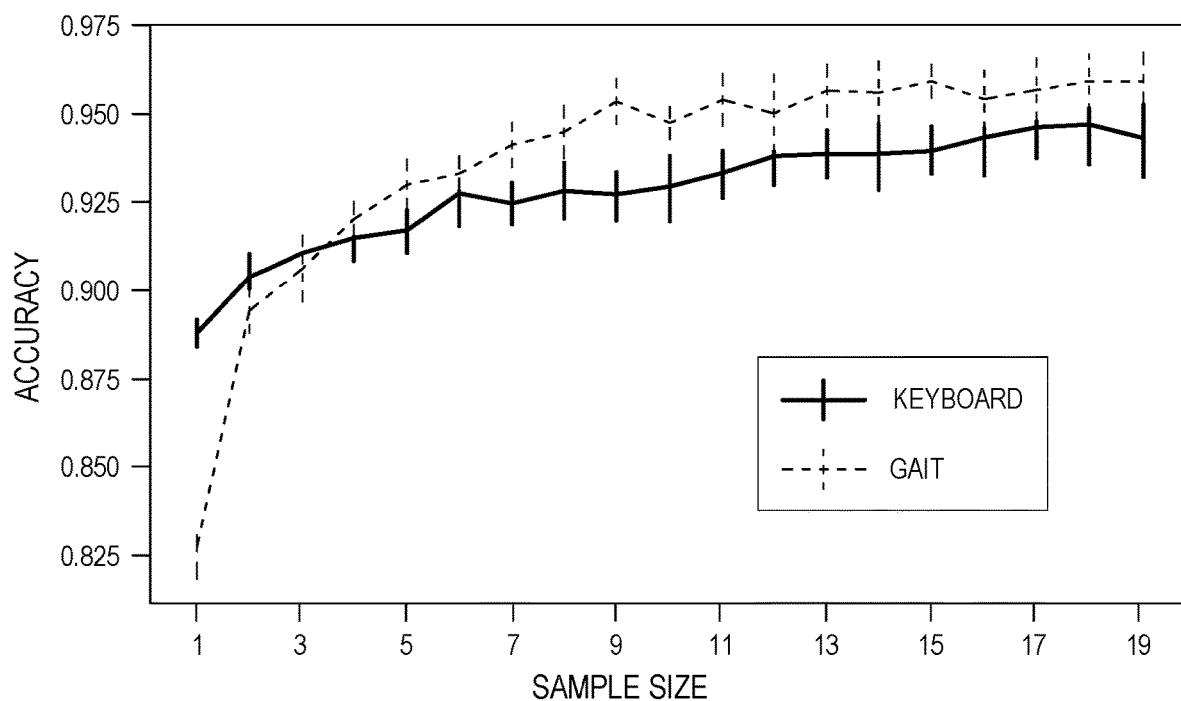
FIG. 5 depicts determinate vector accuracy for five sample enrollment signatures while varying a test vector sample size, in accordance with aspects described herein.

Next, the effect of increasing the number of samples used as test vectors for performing verification is examined. As with enrollment signatures, minimal data is desired. FIG. 5 depicts determinate vector accuracy for five sample enrollment signatures while varying a test vector sample size for keystroke and gait modalities, in accordance with aspects described herein. Accuracy is displayed as the inverse of EER. FIG. 5 illustrates the performance of determinate vectors for both domains in the MultiMod dataset with enrollment signatures including five samples. Increasing the number of samples used as test vectors can significantly improve accuracy, especially for gait verification. Improvements become marginal beyond five samples.

Figure 6:
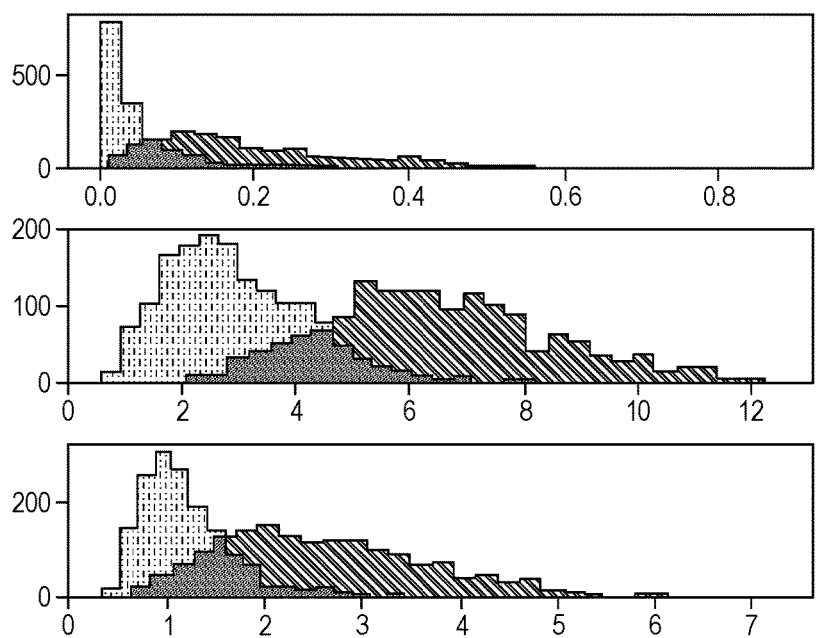
FIG. 6 depicts example separation across similarity measures, in accordance with aspects described herein.

One proposed enhancement of the determinate vector framework is the use of two additional similarity measures, $L^2$ and z-score, as opposed to only cosine similarity. In general, cosine similarity works well in separating determinate vectors from valid and invalid subjects. However, in some domains, such as mobile gait verification, the other measures ($L^2$, z-score) were more accurate. FIG. 6 depicts example separation across similarity measures for the UCI dataset, in accordance with aspects described herein. FIG. 6 shows the separation of valid and invalid subject distributions across the three measures, with the upper graph corresponding to the cosine measure, the middle graph corresponding to the $L^2$ measure, and the bottom graph corresponding to the z-score measure. In this case, $L^2$ provides better separation. To improve overall performance, proposed herein is a combination of the multiple measures.

In considering the performance that can be achieved by fusing tests from different modalities of data in an ensemble, proposed is a Bayesian averaging approach. The prediction error between modalities is assumed to be independent (i.e., subjects that have similar gaits will not necessarily have similar typing styles). As the output of the determinate vector method is a probability, the modalities can be fused using Bayes' theorem with a uniform prior:

$$Pr(\text{valid} | gm, km) = \frac{Pr(km | \text{valid}) Pr(gm | \text{valid})}{Pr(gm, km | \text{valid}) + Pr(gm, km | \text{imposter})} \quad \text{(Eq. 2)}$$

where Pr(km\valid) is the probability that the keyboard model assigns to a valid user, and Pr(gm\imposter) is the probability that the gait model assigns to an imposter. FIG.

Figure 7:
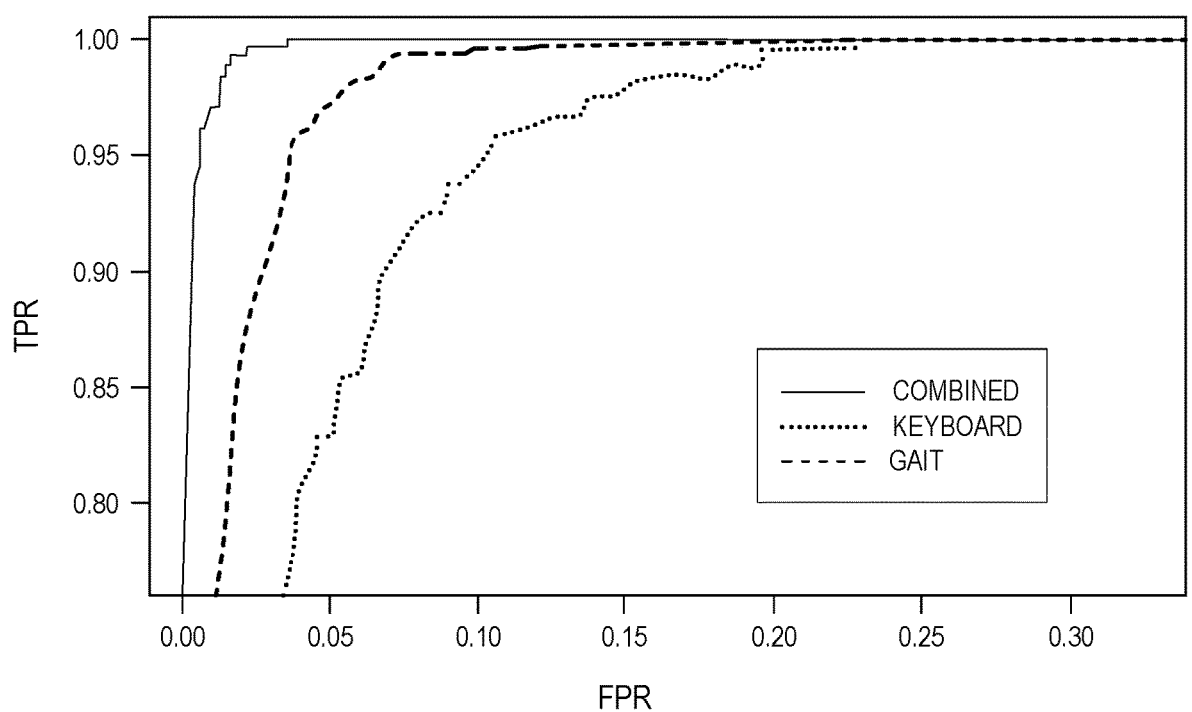
FIG. 7 depicts a true positive rate versus false positive rate for determinate-vector-based user identification verification, in accordance with aspects described herein.

7 depicts a true positive rate versus false positive rate for determinate-vector-based user identification verification, in accordance with aspects described herein. The combined result is the Bayesian fusion of keystroke and gait. FIG. 7 shows the results of fusing mobile keystroke and mobile gait determinate vector verification tests on MultiMod using this approach. The ensemble achieves significantly greater performance, 2.5% EER, than either single modality test.

Accordingly, presented herein is the use of determinate vectors as a general purpose framework for training and employing DNN-based models for keystroke and gait biometric verification problems. Various processes for behavioral verification of user identity in accordance with aspects described herein are depicted with reference to FIGS. 8A-8D.

Figure 8A:
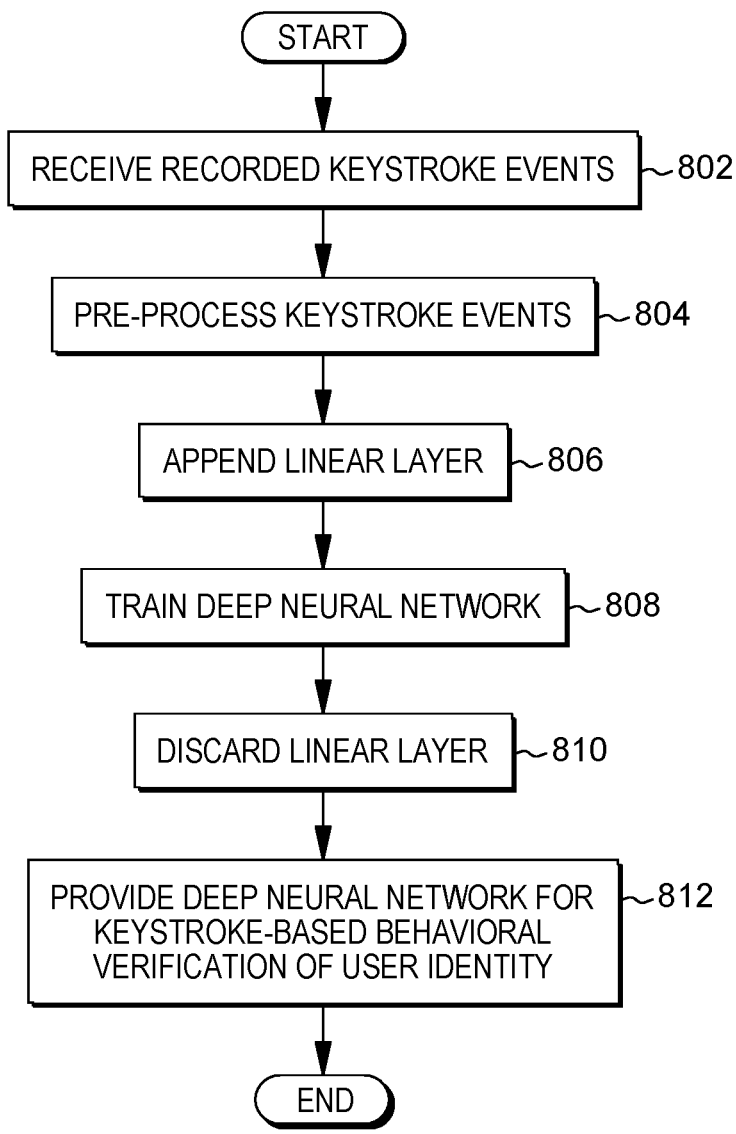
FIGS. 8A-8D depict example processes for behavioral verification of user identity, in accordance with aspects described herein.

FIG. 8A depicts an example process for building and providing a deep neural network for keystroke-based behavioral verification of user identity, in accordance with aspects described herein. The building of the deep neural network for the keystroke-based behavioral verification of user identity includes receiving a plurality of recorded keystroke events (802). Each recorded keystroke event of the plurality of recorded keystroke events includes, as an example, an indication of whether the recorded keystroke event is a key press or a key release, a key identifier of the respective key pressed or released, and a timestamp of the recorded keystroke event. The process continues by performing pre-processing of the plurality of recorded keystroke events (804), which provides data structures representing sequential key events for processing by the deep neural network to extract local patterns. The deep neural network includes at least one convolution layer for feature detection.

A linear layer having a linear activation function is appended to the deep neural network (806). The linear layer includes in one example a one-dimensional vector of length n, where n is a number of subject users represented by keystroke data of the recorded keystroke events. Each output node of the linear layer corresponds to a predicted probability that a keystroke data sample is for a specific subject user of the subject users.

Thus, the process continues with training the deep neural network using the data structures representing the sequential key events (808). The appended linear layer is used to train the deep neural network as an n-class classification problem using logistic regression to learn linearly-separable features for identifying users. As part of this training, the data structures of sequential key events are fed into the deep neural network for feature extraction. The feature extraction includes, in examples, applying a first convolution filter to detect features from a single key press and key release series of recorded keystroke events, and applying a second convolution filter to detect features from across a fixed number of keystrokes occurring within a given duration of time.

When training concludes, the linear layer is discarded (810) from the deep neural network to result in a trained deep neural network that can be used for keystroke-based behavioral verification of user identity, in which the trained deep neural network translates user keystroke data into points within a deep neural network vector space of the deep neural network. Continuing with the process of FIG. 8A, the built deep neural network is then provided (812) for keystroke-based behavioral verification of user identity based on the determinate vectors output from the trained deep neural network.

Pre-processing the recorded keystroke events renders the data in a proper state for feeding to the deep neural network. Example pre-processing obtains processed keystroke event data by converting the timestamps of the plurality of recorded keystroke events to relative times and determining a collection of deltas representing differences in times between consecutive key events, then normalizing at least some deltas of the collection of deltas to a normal distribution using an exponential distribution function. Deltas, of the collection of deltas, that exceed a predefined threshold amount of time are not included in the group of deltas that are transformed by the normalizing. This processed keystroke event data is then converted into the data structures of sequential key events.

The process of FIG. 8A is performed by one or more computer systems. In one example, the process is performed by a first computer system (for instance one or more servers) in communication with a second computer system (for instance a client device on which user identity of a subject user of the client device is to be verified as being an identified user). The server(s) receive (802) the recorded keystroke events from any source, such as a database or other storage, or the client device or other computer recording the keystroke events. The server(s) perform the pre-processing, appending the linear layer, training the DNN, and discarding the linear layer. These activities provide (812) the trained DNN locally. The trained DNN may also be provided, if desired, to the client device for use of the DNN as described herein.

Alternatively, the client device may perform various steps of FIG. 8A. For instance, the receiving the recorded keystroke events may be performed by the client device by collecting these events as the user interacts with the client device. The pre-processing and training may also be performed by the client device, though in some cases, such as cases where the client device is a user's mobile device, such processing may be prohibitively expensive in terms of computational resources to perform on the client device. As such, the client can send the keystroke events to other computer systems (e.g. servers) to perform the relatively intensive processing involved in the pre-processing, appending, and/or training of FIG. 8A. The trained DNN may then be provided to the client device for use of the DNN as described herein.

Figure 8B:
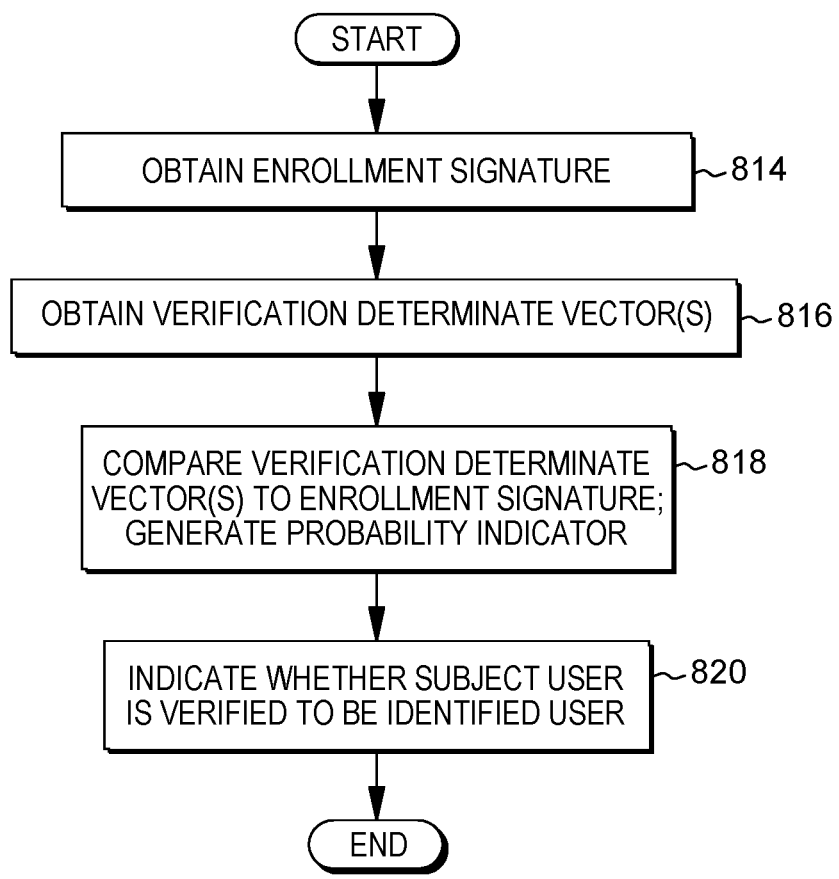

Example uses of a trained DNN are now presented with reference to FIG. 8B, which depicts an example process for keystroke-based behavioral verification of user identity, in accordance with aspects described herein. Aspects of FIG. 8B can be performed periodically or aperiodically to repeatedly verifying user identity, for instance for user authentication purposes after a login to a computer system. The process obtains an enrollment signature corresponding to an identified user and serving as a unique identifier of the identified user (814). The enrollment signature is what will be compared to verification vector(s) output from the DNN based on other data, termed verification keystroke data, i.e. data from a subject user who may or may not be the identified user.

The enrollment signature includes an enrollment determinate vector generated based on supplying enrollment keystroke data to a deep neural network for processing, the deep neural network being, for instance, a built and trained DNN in accordance with the process of FIG. 8A. The enrollment signature may be obtained by generating the enrollment signature or receiving the enrollment signature from another computer system. An example of generating the enrollment signature includes feeding a plurality of samples of enrollment keystroke data into the deep neural network and obtaining a corresponding plurality of determinate vectors as output from the deep neural network, then generating a composite determinate vector as a composite of the plurality of determinate vectors output from the deep neural network. The composite determinate vector may be the enrollment determinate vector of the enrollment signature. Generating the composite determinate vector can determine an average determinate vector from the plurality of determinate vectors, with the average determinate vector being used as the enrollment determinate vector of the enrollment signature.

The process of FIG. 8B continues by obtaining one or more verification determinate vectors output from the deep neural network (816). The one or more verification determinate vectors are for comparison to the enrollment signature to determine whether the subject user is the identified user corresponding to the obtained enrollment signature. The verification determinate vector(s) may be obtained by obtaining verification keystroke data from input, by the subject user (the user whose identity is to be verified), to a computer system, and supplying the verification keystroke data to the deep neural network and obtaining, as output, the verification determinate vector(s). The obtaining and supplying can be performed by the computer system to which the input is provided by the subject user, or another computer system. Obtaining the verification keystroke data can include the receiving a plurality of recorded keystroke events and the pre-processing of those events, that mirrors these activities described above with reference to FIG. 8A. For instance, each recorded keystroke event of the plurality of recorded keystroke events can include an indication of whether the recorded keystroke event is a key press or a key release, a key identifier of the respective key pressed or released, and a timestamp of the recorded keystroke event, and those events can be pre-processes to provide the verification keystroke data as data structures representing sequential key events for processing by the deep neural network to extract local patterns. The deep neural network being used can include at least one convolution layer for feature detection, and the pre-processing can include obtaining processed keystroke event data by (i) converting the timestamps of the plurality of recorded keystroke events to relative times and determining a collection of deltas representing differences in times between consecutive key events, and (ii) normalizing at least some deltas of the collection of deltas to a normal distribution using an exponential distribution function, where one or more deltas, of the collection of deltas, exceeding a predefined threshold amount of time are not included in the at least some deltas that are transformed by the normalizing. The processed keystroke event data can then be converted into the verification keystroke data that is supplied to the deep neural network.

Any aspects of the obtaining the verification determinate vector(s) can be performed by any computer system(s) desired, for instance a client device that the subject user is using, or a remote device such as a server to perform, or a combination.

Returning to FIG. 8B, the process compares the verification determinate vector(s) to the enrollment signature and generates a probability indicator indicating a probability that keystroke data from a common user produced, from the deep neural network, the enrollment signature and the verification determinate vector(s) (818). In this aspect, the comparison of the vectors produced from the DNN indicates whether the keystroke events from the subject (unidentified) user produced sufficiently similar determinate vectors from the DNN as the keystroke events of a particular (identified) user. If so, it can be confidently concluded that the same user provided the two different keystroke event data collections.

The comparing the verification determinate vector(s) to the enrollment signature uses a similarity scoring function indicating a level of similarity between the verification determinate vector(s) and the enrollment signature. In some embodiments, this similarity score includes multiple scores, e.g. a cosine similarity score as between the verification determinate vector(s) and the enrollment signature, an $L^2$ distance score as between the verification determinate vector(s) and the enrollment signature, and a z-score of the verification determinate vector(s) relative to the enrollment signature. The cosine similarity score, $L^2$ distance score, and z-score can be combined as features to a linear binary logistic regression classifier that learns an appropriate threshold for verifying whether the enrollment signature and the verification determinate vector(s) were generated based on keystroke data from a common user.

In cases where more than one verification determinate vector is produced, the comparing can compare each such verification determinate vector to the enrollment signature to determine a respective probability indicator corresponding to the verification determinate vector. The generated probability indicator can be generated in any desired fashion, for instance by compositing some or all of the respective probability indicators corresponding to the verification determinate vectors.

The process of FIG. 8B continues by indicating to the computer system whether, based on the probability indicator, the subject user is verified to be the identified user (820).

The process of FIG. 8B may be performed in whole or in part by one or more computer systems, such as a client device, remote device(s), or a combination of the two. Thus, the indication to the computer system whether the subject user is verified to be the identified user may be raised by the computer system itself if performing the comparing. In a particular example, the computer system is a client computer system that receives the trained DNN and the enrollment signature from a remote device (or builds and trains the DNN, and generates the enrollment signature itself). The client obtains verification keystroke data and processes that as described above to obtain the verification determinate vector(s), then the client performs the comparison, and raises the indication.

In other examples, the client, which is the computer system that the subject user uses and that receives the indication (820), obtains the verification keystroke data and supplies the verification keystroke data to a remote computer system. The remote computer system performs the processing to obtain the verification determinate vector(s), and then sends those vector(s) to the client. The client receives the verification determinate vector(s) from the remote computer system and performs the comparing. In yet another example, the remote system itself possesses the enrollment signature and performs the comparing, then sends to the client the indication of whether the subject user is verified to be the identified user. In this latter regard, the client may be involved only to the extent that it records and sends keystroke data to the remote system, which performs processing of FIG. 8B to produce the verification determinate vectors and compare to the enrollment signature.

Figure 8C:
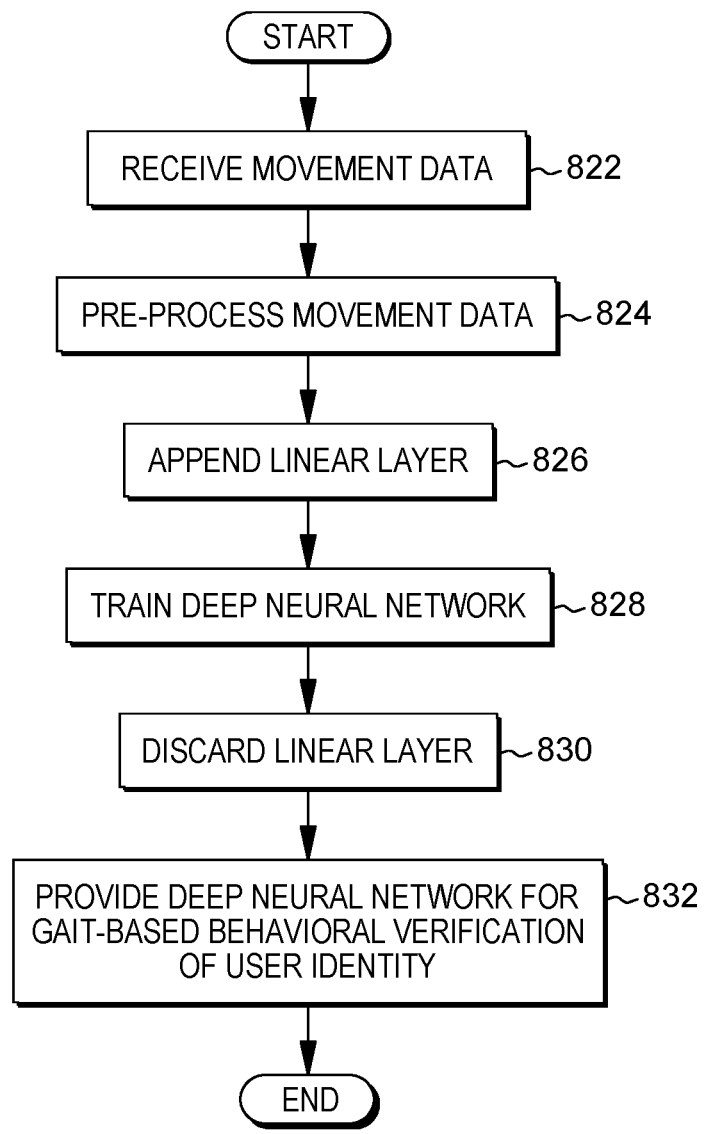

FIG. 8C depicts an example process for building and providing a deep neural network for gait-based behavioral verification of user identity, in accordance with aspects described herein. The building of the deep neural network for the gait-based behavioral verification of user identity includes receiving movement data describing movement, in multiple dimensions, of one or more computer systems of one or more users (822). The movement data includes sensor data acquired from one or more sensors of the one or more computer systems. The process continues by performing pre-processing of the movement data (824), which provides processed movement data for processing by a deep neural network to extract local patterns.

A linear layer having a linear activation function is appended to the deep neural network (826). The linear layer includes in one example a one-dimensional vector of length n, where n is a number of subject users represented by movement data of the received movement data. Each output node of the linear layer corresponds to a predicted probability that a movement data sample is for a specific subject user of the subject users.

Thus, the process continues with training the deep neural network using the processed movement data (828). The appended linear layer is used to train the deep neural network as an n-class classification problem using logistic regression to learn linearly-separable features for identifying users. As part of this training, the processed movement data is fed into the deep neural network for feature extraction. The deep neural network includes, in some examples, a plurality of connected rectified linear unit (ReLU) activated layers. During the training, parameters of the plurality of connected ReLU activated layers are updated.

When training concludes, the linear layer is discarded (830) from the deep neural network to result in a trained deep neural network that can be used for gait-based behavioral verification of user identity, in which the trained deep neural network translates user movement data into points within a deep neural network vector space of the deep neural network. Continuing with the process of FIG. 8B, the built deep neural network is then provided (832) for gait-based behavioral verification of user identity based on the determinate vectors output from the trained deep neural network.

Pre-processing the received movement data renders the data in a proper state for feeding to the deep neural network. Example pre-processing is as follows: magnitudes of the movement data are determined as a composite of movement in x, y, and z dimensions. A constant representing gravitational force is subtracted from at least some of the magnitudes, and individual spikes in magnitude above a threshold are filtered out as noise. Then step-detection is performed against at least some of the movement data, the step detection to isolates a plurality of samples of movement data having a given number (e.g. 6) of consecutive steps that one or more corresponding users has taken. Signal processing features are then extracted from the plurality of samples. During the training the plurality of connected ReLU activated layers described above perform additional feature extraction on the signal processing features extracted from these plurality of samples.

In examples, the extracting includes determining a periodogram estimating a power spectral density, filtering-out power spectra above a predefined frequency as noise, and feeding the power spectral density into a filterbank to produce a fixed-length set of features. The extracting can include establishing coefficients of the filterbank by creating a triangular filterbank across frequencies in the power spectral density for each step in a sample, and generating overlapping filters spaced between a selected low and a selected high frequency.

The process of FIG. 8C is performed by one or more computer systems. In one example, the process is performed by a first computer system (for instance one or more servers) in communication with a second computer system (for instance a client device on which user identity of a subject user of the client device is to be verified as being an identified user). The server(s) receive (802) the movement data from any source, such as a database or other storage, or the client device or other computer recording the movement data. The server(s) perform the pre-processing, appending the linear layer, training the DNN, and discarding the linear layer. These activities provide (832) the trained DNN locally. The trained DNN may also be provided, if desired, to the client device for use of the DNN as described herein.

Alternatively, the client device may perform various steps of FIG. 8C. For instance, the client may receive the movement data by collecting the data as the subject user moves with the client device on the user's person. The pre-processing and training may also be performed by the client device, though in some cases, such as cases where the client device is a user's mobile device, such processing may be prohibitively expensive in terms of computational resources to perform on the client device. As such, the client can send the movement data to other computer systems (e.g. servers) to perform the relatively intensive processing involved in the pre-processing, appending, and/or training of FIG. 8C. The trained DNN may then be provided to the client device for use of the DNN as described herein.

Figure 8D:
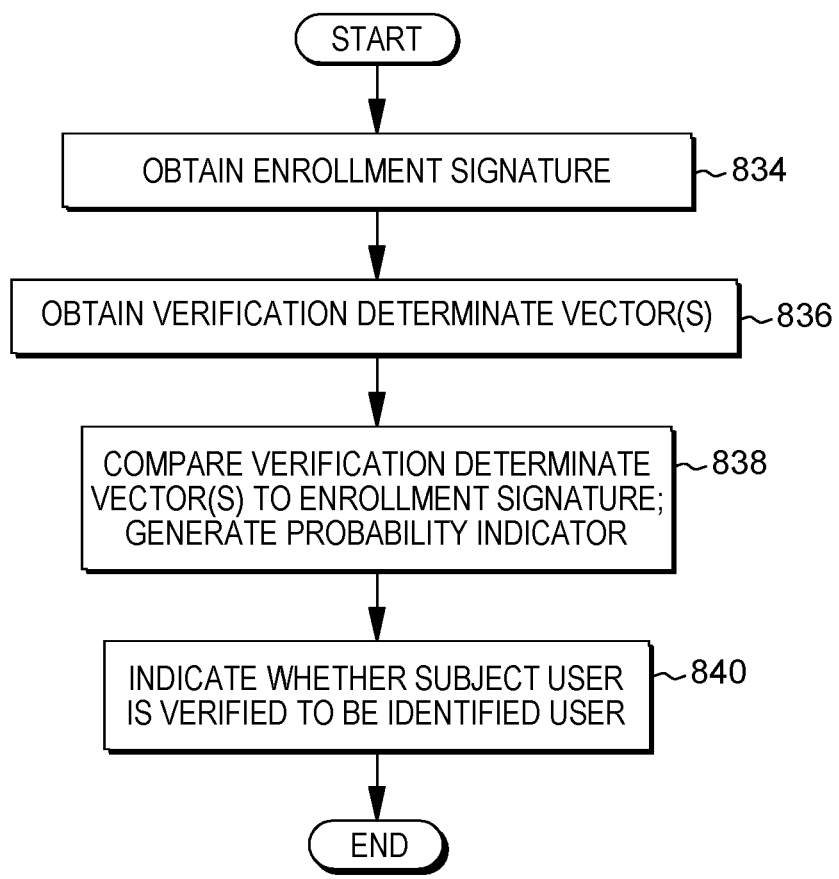

Example uses of a trained DNN are now presented with reference to FIG. 8D, which depicts an example process for gait-based behavioral verification of user identity, in accordance with aspects described herein. Aspects of FIG. 8D can be performed periodically or aperiodically to repeatedly verifying user identity, for instance for user authentication purposes after a login to a computer system. The process obtains an enrollment signature corresponding to an identified user and serving as a unique identifier of the identified user (834). The enrollment signature is what will be compared to verification vector(s) output from the DNN based on other data, termed verification gait data, i.e. data from a subject user who may or may not be the identified user.

The enrollment signature includes an enrollment determinate vector generated based on supplying enrollment gait data, which records gait of the identified user, to a deep neural network for processing, the deep neural network being, for instance, a built and trained DNN in accordance with the process of FIG. 8D. The enrollment signature may be obtained by generating the enrollment signature or receiving the enrollment signature from another computer system. An example of generating the enrollment signature includes feeding a plurality of samples of enrollment gait data into the deep neural network and obtaining a corresponding plurality of determinate vectors as output from the deep neural network, then generating a composite determinate vector as a composite of the plurality of determinate vectors output from the deep neural network. The composite determinate vector may be the enrollment determinate vector of the enrollment signature. Generating the composite determinate vector can determine an average determinate vector from the plurality of determinate vectors, with the average determinate vector being used as the enrollment determinate vector of the enrollment signature.

The process of FIG. 8D continues by obtaining one or more verification determinate vectors output from the deep neural network (836). The one or more verification determinate vectors are for comparison to the enrollment signature to determine whether the subject user is the identified user corresponding to the obtained enrollment signature. The verification determinate vector(s) may be obtained by obtaining verification gait data from sensor data gathered by the computer system, the verification gait data recording a gait of the subject user, the supplying the verification gait data to the deep neural network and obtaining, as output, the verification determinate vector(s). The obtaining and supplying can be performed by the computer system gathering the sensor data or another computer system. Obtaining the verification gait data can include the receiving the movement data and the pre-processing the movement data, that mirrors these activities described above with reference to FIG. 8C. For instance, it can include the receiving the movement data describing movement of the computer system in multiple dimensions, the movement data including the sensor data, and the sensor data acquired from one or more sensors of the computer system. That movement data can be pre-processed to provide the verification gait data as the processed movement data for processing by the deep neural network to extract local patterns, and the pre-processing can determine magnitudes of the movement data as a composite of movement in x, y, and z dimensions, filter out individual spikes in magnitude above a threshold as noise, perform step detection against at least some of the movement data, the step detection isolating a plurality of samples of movement data having a given number of consecutive steps that one or more corresponding users has taken, and extracting signal processing features from the plurality of samples.

Any aspects of the obtaining the verification determinate vector(s) can be performed by any computer system(s) desired, for instance a client device that the subject user is using, or a remote device such as a server to perform, or a combination.

Returning to FIG. 8D, the process compares the verification determinate vector(s) to the enrollment signature and generates a probability indicator indicating a probability that gait data from a common user produced, from the deep neural network, the enrollment signature and the verification determinate vector(s) (838). In this aspect, the comparison of the vectors produced from the DNN indicates whether the gait data from the subject (unidentified) user produced sufficiently similar determinate vectors from the DNN as the gait data of a particular (identified) user. If so, it can be confidently concluded that the same user provided the two different gait data collections.

The comparing the verification determinate vector(s) to the enrollment signature uses a similarity scoring function indicating a level of similarity between the verification determinate vector(s) and the enrollment signature. In some embodiments, this similarity score includes multiple scores, e.g. a cosine similarity score as between the verification determinate vector(s) and the enrollment signature, an $L^2$ distance score as between the verification determinate vector(s) and the enrollment signature, and a z-score of the verification determinate vector(s) relative to the enrollment signature. The cosine similarity score, $L^2$ distance score, and z-score can be combined as features to a linear binary logistic regression classifier that learns an appropriate threshold for verifying whether the enrollment signature and the verification determinate vector(s) were generated based on gait data from a common user.

In cases where more than one verification determinate vector is produced, the comparing can compare each such verification determinate vector to the enrollment signature to determine a respective probability indicator corresponding to the verification determinate vector. The generated probability indicator can be generated in any desired fashion, for instance by compositing some or all of the respective probability indicators corresponding to the verification determinate vectors.

The process of FIG. 8D continues by indicating to the computer system whether, based on the probability indicator, the subject user is verified to be the identified user (840).

The process of FIG. 8D may be performed in whole or in part by one or more computer systems, such as a client device, remote device(s), or a combination of the two. Thus, the indication to the computer system whether the subject user is verified to be the identified user may be raised by the computer system itself if performing the comparing. In a particular example, the computer system is a client computer system that receives the trained DNN and the enrollment signature from a remote device (or builds and trains the DNN, and generates the enrollment signature itself). The client obtains verification gait data and processes that as described above to obtain the verification determinate vector(s), then the client performs the comparison, and raises the indication.

In other examples, the client, which is the computer system that the subject user uses and that receives the indication (840), obtains the verification gait data and supplies the verification gait data to a remote computer system. The remote computer system performs the processing to obtain the verification determinate vector(s), and then sends those vector(s) to the client. The client receives the verification determinate vector(s) from the remote computer system and performs the comparing. In yet another example, the remote system itself possesses the enrollment signature and performs the comparing, then sends to the client the indication of whether the subject user is verified to be the identified user. In this latter regard, the client may be involved only to the extent that it records and sends gait data to the remote system, which performs processing of FIG. 8D to produce the verification determinate vectors and compare to the enrollment signature.

Although various examples are provided, variations are possible without departing from a spirit of the claimed aspects.

Figure 9:
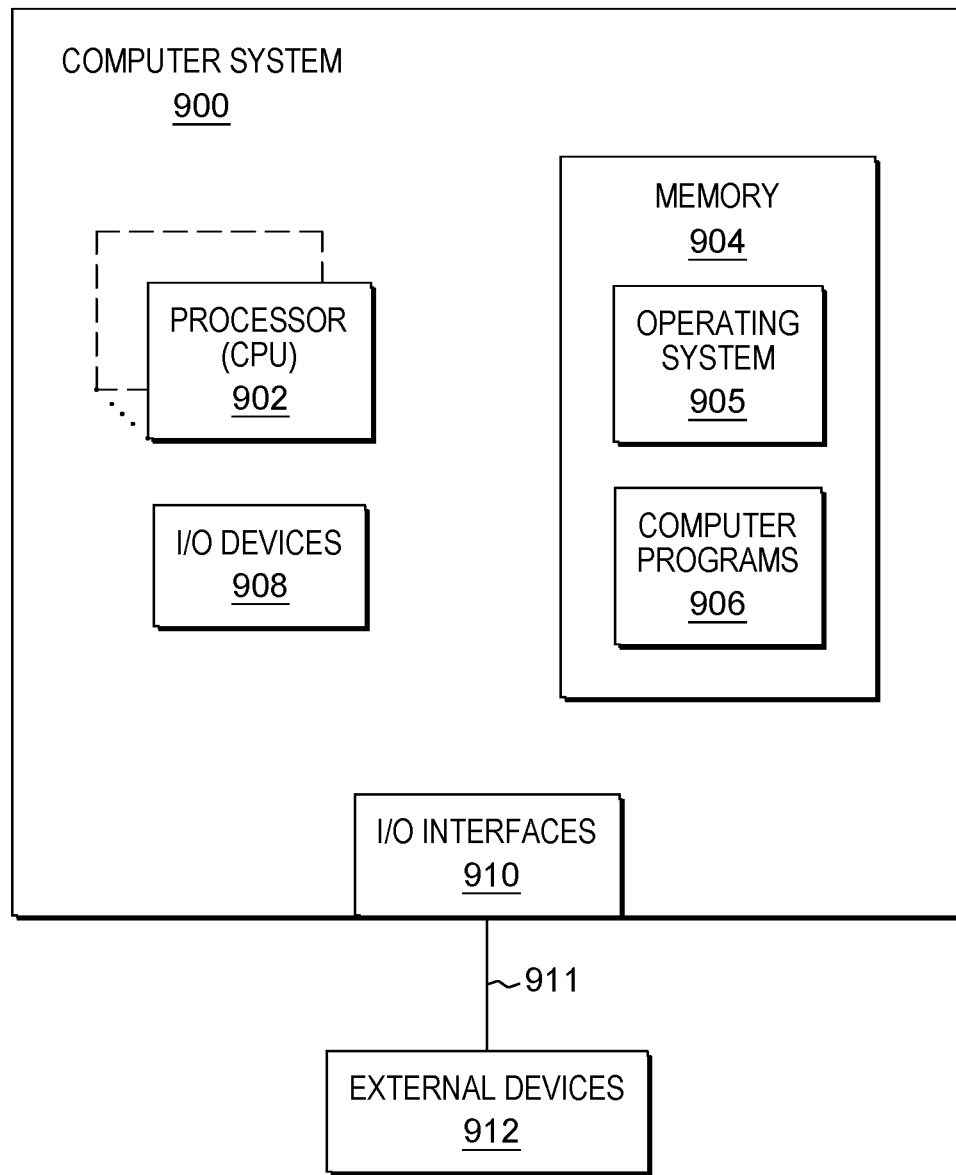
FIG. 9 depicts one example of a computer system and associated devices to incorporate and/or use aspects described herein.

Processes described herein may be performed singly or collectively by one or more computer systems, such as one or more computer systems of a user, one or more remote computer systems/server, or a combination of the foregoing, as examples. FIG. 9 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by Intel Corporation (Santa Clara, Calif., USA) or ARM Holdings plc (Cambridge, England, United Kingdom), as examples.

FIG. 9 shows a computer system 900 in communication with external device(s) 912. Computer system 900 includes one or more processor(s) 902, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 902 can also include register(s) to be used by one or more of the functional components. Computer system 900 also includes memory 904, input/output (I/O) devices 908, and I/O interfaces 910, which may be coupled to processor(s) 602 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 904 can be or include main or system memory (e.g. Random Access Memory) used in the execution of program instructions, storage device(s) such as hard drive(s), flash media, or optical media as examples, and/or cache memory, as examples. Memory 904 can include, for instance, a cache, such as a shared cache, which may be coupled to local caches (examples include L1 cache, L2 cache, etc.) of processor(s) 902. Additionally, memory 904 may be or include at least one computer program product having a set (e.g., at least one) of program modules, instructions, code or the like that is/are configured to carry out functions of embodiments described herein when executed by one or more processors.

Memory 904 can store an operating system 905 and other computer programs 906, such as one or more computer programs/applications that execute to perform aspects described herein. Specifically, programs/applications can include computer readable program instructions that may be configured to carry out functions of embodiments of aspects described herein.

Examples of I/O devices 908 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (912) coupled to the computer system through one or more I/O interfaces 910.

Computer system 900 may communicate with one or more external devices 912 via one or more I/O interfaces 910. Example external devices include a keyboard, a pointing device, a display, and/or any other devices that enable a user to interact with computer system 900. Other example external devices include any device that enables computer system 900 to communicate with one or more other computing systems or peripheral devices such as a printer. A network interface/adapter is an example I/O interface that enables computer system 900 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 910 and external devices 912 can occur across wired and/or wireless communications link(s) 911, such as Ethernet-based wired or wireless connections. Example wireless connections include cellular, Wi-Fi, Bluetooth®, proximity-based, near-field, or other types of wireless connections. More generally, communications link(s) 911 may be any appropriate wireless and/or wired communication link(s) for communicating data.

Particular external device(s) 912 may include one or more data storage devices, which may store one or more programs, one or more computer readable program instructions, and/or data, etc. Computer system 900 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 900 may be operational with numerous other general purpose or special purpose computing system environments or configurations. Computer system 900 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

Embodiments of the invention may take the form of a system, a method, and/or a computer program product, any of which may be configured to perform or facilitate aspects described herein.

In some embodiments, aspects of the present invention may take the form of a computer program product, which may be embodied as computer readable medium(s). A computer readable medium may be a tangible storage device/medium having computer readable program code/instructions stored thereon. Example computer readable medium(s) include, but are not limited to, electronic, magnetic, optical, or semiconductor storage devices or systems, or any combination of the foregoing. Example embodiments of a computer readable medium include a hard drive or other mass-storage device, an electrical connection having wires, random access memory (RAM), read-only memory (ROM), erasable-programmable read-only memory such as EPROM or flash memory, an optical fiber, a portable computer disk/diskette, such as a compact disc read-only memory (CD-ROM) or Digital Versatile Disc (DVD), an optical storage device, a magnetic storage device, or any combination of the foregoing. The computer readable medium may be readable by a processor, processing unit, or the like, to obtain data (e.g. instructions) from the medium for execution. In a particular example, a computer program product is or includes one or more computer readable media that includes/stores computer readable program code to provide and facilitate one or more aspects described herein.

As noted, program instruction contained or stored in/on a computer readable medium can be obtained and executed by any of various suitable components such as a processor of a computer system to cause the computer system to behave and function in a particular manner. Such program instructions for carrying out operations to perform, achieve, or facilitate aspects described herein may be written in, or compiled from code written in, any desired programming language. In some embodiments, such programming language includes object-oriented and/or procedural programming languages such as C, C++, C#, Java, etc.

Program code can include one or more program instructions obtained for execution by one or more processors. Computer program instructions may be provided to one or more processors of, e.g., one or more computer systems, to produce a machine, such that the program instructions, when executed by the one or more processors, perform, achieve, or facilitate aspects of the present invention, such as actions or functions described in flowcharts and/or block diagrams described herein. Thus, each block, or combinations of blocks, of the flowchart illustrations and/or block diagrams depicted and described herein can be implemented, in some embodiments, by computer program instructions.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer implemented method for gait-based behavioral verification of user identity of a subject user of a computer system, the method comprising:
   obtaining an enrollment signature corresponding to an identified user and serving as a unique identifier of the identified user, the enrollment signature comprising an enrollment determinate vector generated based on supplying enrollment gait data to a deep neural network, the enrollment gait data recording a gait of the identified user;
   obtaining, based on verification gait data recording a gait of the subject user and gathered using one or more sensors of the computer system, one or more verification determinate vectors output from the deep neural network, the one or more verification determinate vectors for comparison to the enrollment signature to determine whether the subject user is the identified user corresponding to the obtained enrollment signature;
   comparing the one or more verification determinate vectors to the enrollment signature and generating a probability indicator indicating a probability that gait data from a common user produced, from the deep neural network, the enrollment signature and the one or more verification determinate vectors; and
   indicating to the computer system whether, based on the probability indicator, the subject user is verified to be the identified user.

2. The method of claim 1, further comprising:
   gathering the verification gait data from sensor data gathered by the computer system, and
   supplying the verification gait data to the deep neural network and obtaining, as output, the one or more verification determinate vectors.

3. The method of claim 2, further comprising:
   receiving movement data describing movement of the computer system in multiple dimensions, the movement data comprising the sensor data, the sensor data acquired from the one or more sensors of the computer system;
   performing pre-processing of the movement data to provide the verification gait data as processed movement data for processing by the deep neural network to extract local patterns, wherein the pre-processing determines magnitudes of the movement data as a composite of movement in x, y, and z dimensions, filters out individual spikes in magnitude above a threshold as noise, performs step detection against at least some of the movement data, the step detection isolating a plurality of samples of movement data having a given number of consecutive steps that the subject user has taken, and extracts signal processing features from the plurality of samples.

4. The method of claim 2, wherein the computer system performs the obtaining the verification gait data and supplies the verification gait data to a remote computer system, and wherein the computer system receives from the remote computer system, in response to the providing, the one or more verification determinate vectors, wherein the computer system further performs the comparing, and wherein the indicating comprises the computer system raising an indication that the subject user is or is not verified to be the identified user.

5. The method of claim 1, further comprising generating the enrollment signature, the generating comprising:
   feeding a plurality of samples of enrollment gait data into the deep neural network and obtaining a corresponding plurality of determinate vectors as output from the deep neural network; and
   generating a composite determinate vector as a composite of the plurality of determinate vectors output from the deep neural network, the composite determinate vector being the enrollment determinate vector of the enrollment signature.

6. The method of claim 5, wherein generating the composite determinate vector determines an average determinate vector from the plurality of determinate vectors and the average determinate vector is used as the enrollment determinate vector of the enrollment signature.

7. The method of claim 1, wherein the comparing the one or more verification determinate vectors to the enrollment signature uses a similarity scoring function comprising a cosine similarity score as between the one or more verification determinate vectors and the enrollment signature, an $L^2$ distance score as between the one or more verification determinate vectors and the enrollment signature, and a z-score of the one or more verification determinate vectors relative to the enrollment signature, the similarity scoring function indicating a level of similarity between the one or more verification determinate vectors and the enrollment signature.

8. The method of claim 7, wherein the cosine similarity score, $L^2$ distance score, and z-score are combined as features to a linear binary logistic regression classifier that learns an appropriate threshold for verifying whether the enrollment signature and the one or more verification determinate vectors were generated based on gait data from a common user.

9. The method of claim 1, wherein the one or more verification determinate vectors comprise multiple verification determinate vectors, wherein the comparing compares each verification determinate vector of the multiple verification determinate vectors to the enrollment signature to determine a respective probability indicator corresponding to the verification determinate vector, and wherein the generated probability indicator comprises a composite of the respective probability indicators corresponding to the verification determinate vectors.

10. The method of claim 1, wherein the computer system receives the deep neural network from a remote computer system, and performs the obtaining the enrollment signature, the obtaining the one or more verification determinate vectors, and the comparing, and wherein the indicating comprises the computer system raising an indication that the subject user is or is not verified to be the identified user.

11. The method of claim 10, wherein the computer system supplies the enrollment gait data to the deep neural network received from the remote computer system and self-generates the enrollment signature.

12. A system configured to perform a method for gait-based behavioral verification of user identity of a subject user of a computer system, the method comprising:
obtaining an enrollment signature corresponding to an identified user and serving as a unique identifier of the identified user, the enrollment signature comprising an enrollment determinate vector generated based on supplying enrollment gait data to a deep neural network, the enrollment gait data recording a gait of the identified user;
obtaining, based on verification gait data recording a gait of the subject user and gathered using one or more sensors of the computer system, one or more verification determinate vectors output from the deep neural network, the one or more verification determinate vectors for comparison to the enrollment signature to determine whether the subject user is the identified user corresponding to the obtained enrollment signature;
comparing the one or more verification determinate vectors to the enrollment signature and generating a probability indicator indicating a probability that gait data from a common user produced, from the deep neural network, the enrollment signature and the one or more verification determinate vectors; and
indicating to the computer system whether, based on the probability indicator, the subject user is verified to be the identified user.

13. The system of claim 12, wherein the method further comprises:
gathering the verification gait data from sensor data gathered by the computer system; and
supplying the verification gait data to the deep neural network and obtaining, as output, the one or more verification determinate vectors.

14. The system of claim 13, wherein the method further comprises:
receiving movement data describing movement of the computer system in multiple dimensions, the movement data comprising the sensor data, the sensor data acquired from the one or more sensors of the computer system;
performing pre-processing of the movement data to provide the verification gait data as processed movement data for processing by the deep neural network to extract local patterns, wherein the pre-processing determines magnitudes of the movement data as a composite of movement in x, y, and z dimensions, filters out individual spikes in magnitude above a threshold as noise, performs step detection against at least some of the movement data, the step detection isolating a plurality of samples of movement data having a given number of consecutive steps that the subject user has taken, and extracts signal processing features from the plurality of samples.

15. The system of claim 13, wherein the computer system performs the obtaining the verification gait data and supplies the verification gait data to a remote computer system, and wherein the computer system receives from the remote computer system, in response to the providing, the one or more verification determinate vectors, wherein the computer system further performs the comparing, and wherein the indicating comprises the computer system raising an indication that the subject user is or is not verified to be the identified user.

16. The system of claim 12, wherein the comparing the one or more verification determinate vectors to the enrollment signature uses a similarity scoring function comprising a cosine similarity score as between the one or more verification determinate vectors and the enrollment signature, an $L^2$ distance score as between the one or more verification determinate vectors and the enrollment signature, and a z-score of the one or more verification determinate vectors relative to the enrollment signature, the similarity scoring function indicating a level of similarity between the one or more verification determinate vectors and the enrollment signature, wherein the cosine similarity score, $L^2$ distance score, and z-score are combined as features to a linear binary logistic regression classifier that learns an appropriate threshold for verifying whether the enrollment signature and the one or more verification determinate vectors were generated based on gait data from a common user.

17. A computer program product comprising:
a computer readable storage medium storing instructions for execution to perform a method for gait-based behavioral verification of user identity of a subject user of a computer system, the method comprising:
obtaining an enrollment signature corresponding to an identified user and serving as a unique identifier of the identified user, the enrollment signature comprising an enrollment determinate vector generated based on supplying enrollment gait data to a deep neural network, the enrollment gait data recording a gait of the identified user;
obtaining, based on verification gait data recording a gait of the subject user and gathered using one or more sensors of the computer system, one or more verification determinate vectors output from the deep neural network, the one or more verification determinate vectors for comparison to the enrollment signature to determine whether the subject user is the identified user corresponding to the obtained enrollment signature;

comparing the one or more verification determinate vectors to the enrollment signature and generating a probability indicator indicating a probability that gait data from a common user produced, from the deep neural network, the enrollment signature and the one or more verification determinate vectors; and indicating to the computer system whether, based on the probability indicator, the subject user is verified to be the identified user.

18. The computer program product of claim 17, wherein the method further comprises:

receiving movement data describing movement of the computer system in multiple dimensions, the movement data comprising sensor data acquired from the one or more sensors of the computer system;

performing pre-processing of the movement data to provide the verification gait data as processed movement data for processing by the deep neural network to extract local patterns, wherein the pre-processing determines magnitudes of the movement data as a composite of movement in x, y, and z dimensions, filters out individual spikes in magnitude above a threshold as noise, performs step detection against at least some of the movement data, the step detection isolating a plurality of samples of movement data having a given number of consecutive steps that the subject user has taken, and extracts signal processing features from the plurality of samples;

gathering the verification gait data; and supplying the verification gait data to the deep neural network and obtaining, as output, the one or more verification determinate vectors.

19. The computer program product system of claim 18, wherein the computer system performs the obtaining the verification gait data and supplies the verification gait data to a remote computer system, and wherein the computer system receives from the remote computer system, in response to the providing, the one or more verification determinate vectors, wherein the computer system further performs the comparing, and wherein the indicating comprises the computer system raising an indication that the subject user is or is not verified to be the identified user.

20. The computer program product of claim 17, wherein the comparing the one or more verification determinate vectors to the enrollment signature uses a similarity scoring function comprising a cosine similarity score as between the one or more verification determinate vectors and the enrollment signature, an $L^2$ distance score as between the one or more verification determinate vectors and the enrollment signature, and a z-score of the one or more verification determinate vectors relative to the enrollment signature, the similarity scoring function indicating a level of similarity between the one or more verification determinate vectors and the enrollment signature, wherein the cosine similarity score, $L^2$ distance score, and z-score are combined as features to a linear binary logistic regression classifier that learns an appropriate threshold for verifying whether the enrollment signature and the one or more verification determinate vectors were generated based on gait data from a common user.

* * * * *